United States Patent
Clements et al.

(10) Patent No.: US 12,469,071 B2
(45) Date of Patent: Nov. 11, 2025

(54) SALES MECHANISM AND DIGITAL INTERFACE THEREFOR

(71) Applicant: Final Offer, LLC, Hingham, MA (US)

(72) Inventors: Peter Edward Clements, Claremont (AU); Peter John Gibbons, Swanbourne (AU); Bradley Robert Glover, Fremantle (AU); Duncan Royce Anderson, Daglish (AU)

(73) Assignee: Final Offer, LLC, Hingham, MA (US)

( * ) Notice: Subject to any disclaimer, the term of this patent is extended or adjusted under 35 U.S.C. 154(b) by 993 days.

(21) Appl. No.: 17/560,580

(22) Filed: Dec. 23, 2021

(65) Prior Publication Data

US 2022/0114657 A1 Apr. 14, 2022

Related U.S. Application Data

(63) Continuation-in-part of application No. 16/311,989, filed as application No. PCT/AU2017/050642 on Jun. 23, 2017, now Pat. No. 11,250,498.

(30) Foreign Application Priority Data

Jun. 23, 2016 (AU) .............................. 2016902474

(51) Int. Cl.
    G06Q 30/08 (2012.01)
    G06Q 50/16 (2024.01)
(52) U.S. Cl.
    CPC ............. G06Q 30/08 (2013.01); G06Q 50/16 (2013.01)
(58) Field of Classification Search
    None
    See application file for complete search history.

(56) References Cited

U.S. PATENT DOCUMENTS

| | | | | |
|---|---|---|---|---|
| 6,217,448 B1 * | 4/2001 | Olsen | ...................... | G07F 17/32 |
| | | | | 463/30 |
| 7,555,485 B2 * | 6/2009 | Soulanille | .............. | G06Q 30/08 |
| 7,584,139 B2 * | 9/2009 | Goodwin | ............... | G06Q 30/08 |
| | | | | 705/37 |

(Continued)

FOREIGN PATENT DOCUMENTS

JP 2009-193236 A 8/2009

OTHER PUBLICATIONS

Caylor, P., et al., "Rbuy and KnitMedia use Web to its fullest," National Real Estate Investor, 41.8: 8. Jul. 1999. (Year: 1999).*

(Continued)

*Primary Examiner* — Nicholas D Rosen
(74) *Attorney, Agent, or Firm* — Giordano Law LLC; David A. Giordano

(57) ABSTRACT

The invention relates to a system 10 for conducting a sales mechanism over the internet in accordance with an embodiment of the invention. The system 10 comprises a sales platform 18 for vendors of items such as a real estate property, sales facilitators 16 to administer the sales mechanism, and buyers (also referred to as bidders 14) to interact for selling and buying the items offered for sale. The description to follow will refer to a particular application of the sales mechanism for offering for sale a real estate property; however, the sales mechanism may be utilised for offering for sale any tangible or intangible item that is able to be sold.

23 Claims, 25 Drawing Sheets

(56) References Cited

U.S. PATENT DOCUMENTS

| | | | | |
|---|---|---|---|---|
| 7,599,878 B2* | 10/2009 | Atkinson | G06Q 30/08 | |
| | | | 705/37 | |
| 8,335,738 B2* | 12/2012 | Ausubel | G06Q 40/03 | |
| | | | 705/37 | |
| 8,630,916 B2* | 1/2014 | Walker | G06Q 40/04 | |
| | | | 705/14.1 | |
| 8,799,815 B2* | 8/2014 | Hoellwarth | G06F 3/0482 | |
| | | | 715/811 | |
| 9,270,648 B2* | 2/2016 | Brander | H04L 51/046 | |
| 10,250,754 B2* | 4/2019 | Reith | G06Q 30/08 | |
| 10,402,921 B2* | 9/2019 | Hudson | G06Q 30/0611 | |
| 11,250,498 B2* | 2/2022 | Clements | G06Q 30/0641 | |
| 2001/0021923 A1 | 9/2001 | Atkinson et al. | | |
| 2002/0007338 A1 | 1/2002 | Do | | |
| 2003/0041012 A1 | 2/2003 | Grey et al. | | |
| 2004/0039733 A1 | 2/2004 | Soulanille | | |
| 2005/0108125 A1 | 5/2005 | Goodwin et al. | | |
| 2006/0242056 A1* | 10/2006 | Walker | G06Q 30/08 | |
| | | | 705/37 | |
| 2008/0147566 A1 | 6/2008 | Malik | | |
| 2012/0030623 A1* | 2/2012 | Hoellwarth | G06F 3/04817 | |
| | | | 715/811 | |
| 2012/0084168 A1 | 4/2012 | Adair et al. | | |
| 2012/0136745 A1 | 5/2012 | Chalemin et al. | | |
| 2012/0284141 A1 | 11/2012 | Ausubel et al. | | |
| 2013/0006798 A1* | 1/2013 | Yushuva | G06Q 30/08 | |
| | | | 705/26.3 | |
| 2013/0046650 A1 | 2/2013 | Geurts et al. | | |
| 2013/0054317 A1 | 2/2013 | Abhyanker | | |
| 2013/0091047 A1 | 4/2013 | Hough et al. | | |
| 2013/0103530 A1 | 4/2013 | Tilford et al. | | |
| 2013/0232024 A1 | 9/2013 | Nassiri | | |
| 2014/0330664 A1 | 11/2014 | Lisitza | | |
| 2015/0170264 A1* | 6/2015 | Mosley | G06Q 30/08 | |
| | | | 705/26.3 | |
| 2015/0350163 A1* | 12/2015 | Brander | H04L 63/0428 | |
| | | | 726/28 | |
| 2016/0021524 A1* | 1/2016 | Xie | H04W 8/005 | |
| | | | 455/41.1 | |
| 2016/0042447 A1 | 2/2016 | Nasiri | | |
| 2016/0098787 A1* | 4/2016 | Caldwell | G06Q 30/08 | |
| | | | 705/14.14 | |
| 2016/0343052 A1* | 11/2016 | Hudson | G06Q 30/0611 | |
| 2017/0076363 A1 | 3/2017 | Le | | |
| 2018/0220008 A1* | 8/2018 | Reith | H04L 47/821 | |

OTHER PUBLICATIONS

International Search Report and Written Opinion dated Sep. 8, 2017 from International Application No. PCT/AU2017/050642 (Authorised officer, Ravi McCosker), 10 pages.

Zheng Qin, "Introduction to E-commerce", Springer, 2009, 527 pages.

Erica Johnston, "Online auction can keep car prices at bay", 2005, Edmonton Journal, 3 pages.

* cited by examiner

 
Fig. 15a  Fig. 15b
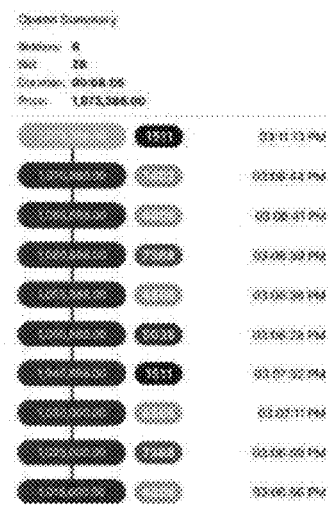 
Fig. 16  Fig. 17

SALES MECHANISM AND DIGITAL INTERFACE THEREFOR

CROSS-REFERENCE TO RELATED APPLICATIONS

This application is a Continuation-in-part of U.S. patent application Ser. No. 16/311,989 filed 20 Dec. 2018 (allowed), which is a U.S. National Stage application of PCT/AU2017/050642 filed 23 Jun. 2017, which claims priority to Australian Application No. 2016902474 filed 23 Jun. 2016, the entire disclosures of which are hereby incorporated by reference in their entireties.

TECHNICAL FIELD

The present invention relates to mechanisms for selling goods and services.

The invention has been devised particularly, although not necessarily solely, in relation to mechanism for selling real-estate properties.

BACKGROUND ART

The following discussion of the background art is intended to facilitate an understanding of the present invention only. The discussion is not an acknowledgement or admission that any of the material referred to is or was part of the common general knowledge as at the priority date of the application.

There exist a great variety of mechanisms for selling goods and services. Examples of these conventional sales mechanisms are auction, tender and private treaty.

The currently known sales mechanisms of goods and services such as the one mentioned above include several drawbacks. Some of these sales mechanisms make it nearly impossible for a certain group of potential purchasers of the goods and services to participate in these conventional sales mechanisms.

Examples of potential purchasers that typically cannot participate in these sales mechanisms are purchasers who are not cash unconditional buyers but instead their purchasing capacity is subject to terms and conditions such as finance, extended settlement dates, and alternate deposit amounts.

Auction processes are particular sales mechanisms that very often are used for selling of real-estate property.

Several auction processes have been in use for years. Prior to the internet era only traditional auctions were available which conventionally took the form of a public gathering of participants assembled together within a specified location; this location being typically where the items to be auctioned were present and available to view by the participants of the auction. At such conventional auctions, an auctioneer is the conductor of the auction and the individual responsible for providing the goods to the participants of the auction. Incited by the direction of the auctioneer, bidding was conducted simultaneously, successively and competitively among a group of participants present at the auction site. These auctions had their limitations. In particular, if a relative large number of bidders is present at the auction of a real-estate property not necessarily any of the entire group of bidders have the opportunity to submit a bid. For example, only bidders located closest to the auctioneer are able to provide an overriding bid; bidders located the farthest to the auctioneer may not be capable to submit an overriding bid.

Furthermore, another disadvantage of an auction is that once a successful bidder has secured a particular real-estate property, the remaining bidders leave the auction, making it difficult for auctioneers to follow them up should the sale of the real-estate property not be concluded.

Moreover, a further disadvantage is that there is often a reticence from potential bidders to publicly bid; this is because, by publicly bidding these bidders identify themselves as potential buyers and publicly disclose their financial capacity to purchase goods and services.

With the advent of the internet; there have been intentions to organise auctions that permit the participants (in particular the bidders) to be located remotely with respect to the location of the auction item (such as a real-estate property). An example of an auction process that permits bidders to be located remotely from the location of the auction item is based on providing a table on a sheet of paper that could be electronically passed around the bidders for each bidder to fill out with an overriding bid.

The previously described "on-line" auction process has its disadvantages. For example, it is difficult to ensure that each bidder submits the bid in substantially the same time period. Typically, some persons would not necessarily be diligent when entering the overriding bid and passing on the filled table to the next bidder as soon as possible.

Furthermore, the above described bidding process was not transparent because the table was not filled out with the overriding bid in front of all of the participant; instead it was filled out by each participant at the privacy of their home or office and then passed onto to the next bidder; thus, all of the bidders did not immediately know the amount of the overriding bid. Also, the above-mentioned factors introduced a substantial delay in the bidding process. Thus, the auction typically spread over considerable periods of time.

Moreover, the order in which the table was passed between bidders may produce unfair advantages to a group of bidders when compared to another group of bidders listed, for example, at the end of the list. Thus, this particular auction process does not allow all bidders to bid simultaneously.

It is against this background that the present invention has been developed.

SUMMARY OF INVENTION

According to a first aspect of invention there is provided a method for conducting a sales process facilitated by a sales facilitator and in which a plurality of bidders submit bids for purchasing an item of real estate implemented via a computer system comprising a server computer having at least one processor connected, via a computer network, to a sales facilitator computing device and bidder computing devices and the processor configured to represent, to the computing devices, a website which conducts the sales process which displays a number of icons which are activable by the bidders via the bidder computing devices, the method comprising the steps of: storing, by the sales facilitator, information relating to the item and to parameters for controlling the sales process including a cost of buying the item now, a reserve price and a number of time periods; starting a first countdown timer, by the processor, to measure a first particular period of time, storing, by each of the bidders, information relating to the respective bidder and to terms of engagement proposed by the bidder and approved by the sales facilitator to enable the bidders to participate in the sales process wherein the terms of engagement includes purchase terms relating to the item of real estate and determining a ranking value for each bidder based on a comparison of the purchase terms proposed by the bidder with pre-selected purchase terms approved by the sales facilitator; displaying to each of the bidders via the bidder devices, a first icon which is activable to allow each of the bidders to input a starting bid for purchasing the item and a second icon displaying a cost of buying the item now which is activable to allow any of the bidders to purchase the item directly; displaying, once the first icon has been activated by any of the bidders, to each of the bidders via the bidder devices, a third icon which is activable to allow one of the bidders to submit an improved bid which has the value of a bid increment added to the starting or the previously improved bid; while the first particular period of time is less than a first period of time, iteratively repeating steps a) and b) unless the second icon has been activated by a particular bidder; a) when the first particular period of time is less than a difference between the first and a second time period, then permitting any bidder, to activate the third icon thereby allowing the bidder to improve their bid; b) when the first particular period of time is less than a difference between the first and second time periods, impeding the bidders from activating the first or second icons; starting a second countdown timer, by the processor, to measure a second particular period of time and iteratively performing the following step of: displaying to each of the bidders via the bidder devices, a fourth icon which is activable to allow a particular bidder to improve their bid; while the second particular period of time is less than the third period of time and the improved bid is less than the reserve price, permitting any bidder to activate the fourth icon to improve their bid; resetting the second countdown timer to zero when any improved bid is greater or equal to the reserve price and starting a third countdown timer, by the processor, to measure a third particular period of time, and, while the third particular period of time is less than a fourth period of time iteratively performing the steps of: permitting any bidder to activate the fourth icon to improve its previous bid; determining which at least two bidders have the highest improved bids when compared to the other bidders, determining which of the at least two bidders have a higher ranking value; selling the item to one of at least two bidders on the basis of the bidder's highest improved bids and ranking value.

In an embodiment, the purchase terms relating to the item of real estate comprises a period of settlement of the item of real estate.

In an embodiment, the purchase terms relating to the item of real estate comprises terms associated with finance.

In an embodiment, the purchase terms relating to the item of real estate comprises vacant possession of the item.

In an embodiment, the purchase terms relating to the item of real estate comprises inclusion or exclusion of chattel in respect of the item of real estate.

The method can comprise the step of displaying to users on another website, a fifth activable icon which is representative of the item of real estate and is associated with an address of the website, and when the fifth icon is activated by a user, permits a user of the another web site to be directed to the address of the website for participating in the sales process.

When the user is directed to the website, the method can include displaying to the user the second icon displaying the cost of buying the item now and permitting the user to activate the icon to purchase the item directly.

The method can include the step of determining a ranking value comprises the step of displaying purchase terms pre-selected by the sales facilitator to at least one of the bidders, allowing bidders to activate icons which are configured to allow bidders to select at least one of the purchase terms, wherein each one of the purchase terms is assigned a value and the ranking value of each bidder is based on the cumulative values of the purchase term values selected by each bidder.

The method can further comprise the step of displaying in bidder graphical interfaces of the bidder computing devices and the sales facilitator graphical interface of the sales facilitator computing device, a graphical representation of the sales process comprising icons representing each bidder or each bidder's bids.

The method can further comprise the step of displaying further comprises permitting the sales facilitator to selectively show or conceal the amount of each bid on the icons representing each bidder or each bidder's bids.

The method can further comprise the step of, during execution of the sales process, storing data in the at least one memory device, the data including (1) each of the bids and when the bids were submitted and by which of the bidders and (2) the duration of the bidding process, number of bids, bid increments and the amount of money at which the property was sold.

In an embodiment, the data further includes a last bid of any non-purchasing bidders.

In an embodiment, the data includes the time period when the last bid was made by non-purchasing bidders.

The method can further comprise the step of permitting any of the bidders to withdraw from the sales process and storing data regarding the bidder withdrawal in the memory device.

The method can further comprise the step of collecting the data from a plurality of sales processes and arranging the data as a representation for purposes of assisting another sales process.

In an embodiment, the representation is a graphical or tabular or text/numerical representation.

According to a further aspect of the present invention, there is provided a computer system for conducting a sales process, the computer system comprising: a server computer comprising: at least one processor executing executable code; and at least one memory device communicating with the at least one processor accessible via a computer network and storing the executable code, wherein the executable code, when executed by the at least one processor, causes the at least one processor to: generate and transmit, via the computer network, a signal to a plurality of bidder computing devices and a sales facilitator computing device, the signal being representative of a web site for offering for sale and selling an item of real estate, the web site comprising a plurality of instances of graphical interfaces comprising activable graphics capable to be activated via the sales facilitator computing device and comprising a plurality of instances of graphical interfaces comprising activable graphics capable to be activated via the bidder computing devices; receive via the computer network, signals from the sales facilitator computing device generated via the sales facilitator graphical interface, the signals relating to: information relating to the item; parameters for controlling the sales process including a cost of buying the item now, a reserve price and a number of time periods; the at least one processor, responsive to the signals, storing the information relating to the item and parameter values in the memory device; start a countdown timer executing in the at least one processor for measuring a first period of time, the at least one processor transmitting via the computer network a signal to each bidder computing devices to display the remaining time for visualisation by the bidders; receive via the computer network, signals from the bidder computing devices via the bidder graphical interfaces, the signals relating to, information relating to the respective bidder including terms of engagement proposed by the bidder and approved by the sales facilitator to enable the bidders to participate in the sales process wherein the terms of engagement includes purchase terms relating to the item of real estate, the at least one processor, responsive to the signals, storing the information and parameter values relating to the signals from the bidder computing devices in the memory device, the at least one processor determining a ranking value for each bidder based on a comparison of the purchase terms proposed by the bidder with preferred purchase terms approved by the sales facilitator and storing said ranking values in the memory device; receive by the server via the computer network, signals from one or more of the bidder computing devices generated in response to bidder activation of a first icon which is activable to allow each of the bidders to input a starting bid for purchasing the item and a second icon displaying a cost of buying the item now which is activable to allow any of the bidders to purchase the item directly; generate and transmit via the computer network a signal to the plurality of bidder computing devices, the signal causing the bidder computing devices to display, once the first icon has been activated by any of the bidders, to each of the bidders via the bidder devices, a third icon which is activable to allow one of the bidders to submit an improved bid which has the value of a bid increment added to the starting or the previously improved bid, the at least one processor storing the improved bid in the memory device; while the first particular period of time is less than a first period of time, iteratively repeating steps a) and b) unless the second icon has been activated by a particular bidder; a) when the first particular period of time is less than a difference between the first and a second time period, then the at least one processor receiving signals from bidder computing devices relating to activation of the third icon thereby allowing the bidder to continuously improve their bid; b) when the first particular period of time is less than a difference between the first and second time periods, impeding the bidders from activating the first or second icons; starting a second countdown timer, executing in the processor, to measure a second particular period of time and iteratively performing the following step of: displaying to each of the bidders via the bidder devices, a fourth icon which is activable to allow a particular bidder to improve their bid; while the second particular period of time is less than the third period of time and the improved bid is less than the reserve price, permitting any bidder to activate the fourth icon to improve their bid; resetting the second countdown timer, executing in the at least one processor, to zero when any improved bid is greater or equal to the reserve price and starting a third countdown timer, by the processor, to measure a third particular period of time, the at least one processor sending a signal to the bidder computing devices to display the remaining time measured by the third countdown timer, and, while the third particular period of time is less than a fourth period of time iteratively performing the steps of: permitting any bidder to activate the fourth icon to improve its previous bid; determining which at least two bidders have the highest improved bids when compared to the other bidders, determining which of the at least two bidders have a higher ranking value; selling the item to one of at least two bidders on the basis of the bidders highest improved bids and/or ranking value.

In an embodiment, the at least one processor generates and transmits, via the network, signals to display in the bidder graphical interfaces and the sales facilitator graphical interface a graphical representation of the sales process comprising icons representing each bidder or each bidder's bids.

The system can includes permitting the sales facilitator to input a signal, via the sales facilitator computing device, and the at least one processor, in response to the signal, to selectively show or conceal the amount of each bid of the sales process.

The system can communicate, via the computer network, to a further server computer comprising: at least one further processor executing executable code; and at least one further memory device communicating with the at least one further processor and storing the executable code, wherein the executable code, when executed by the at least one further processor, causes the at least one further processor to: generate and transmit, via the computer network, a signal to the sales facilitator computing device, the signal being representative of a further web site for offering for sale and selling items, one of which is the item of real estate, the further web site comprising a plurality of instances of graphical interfaces comprising activable graphics capable to be activated via the sales facilitator computing device and comprising a plurality of instances of graphical interfaces comprising activable graphics capable to be activated via user computing devices; displaying to users on the further website, a further activable icon which is representative of the item of real estate and is associated with an address of the website, and when the further icon is activated by the user, permits the user of the further website to be directed to the address of the website for participating in the sales process.

When the user is directed to the website from the further website, the system can display to the user the second icon displaying the cost of buying the item now and permitting the user to activate the icon to purchase the item directly.

According to a further aspect of the present invention, there is provided a non-transitory computer readable storage medium storing one or more programs, the one or more programs comprising instructions that, when rendered on a remote computing device, cause the remote computing device to display a web site comprising a plurality of graphical interfaces capable to be activated by a sales facilitator or a plurality of graphical interfaces capable to be activated by a particular bidder when the remote computing device is connected over the internet to a server computer comprising at least one processor executing executable code and at least one memory device communicating with the processor accessible via a computer network and storing the executable code, wherein the executable code, when executed by the at least one processor, causes the at least one processor to: generate and transmit, via the computer network, a signal to a plurality of bidder computing devices and a sales facilitator computing device, the signal being representative of a web site for offering for sale and selling an item of real estate, the web site comprising a plurality of instances of graphical interfaces comprising activable graphics capable to be activated via the sales facilitator computing device and comprising a plurality of instances of graphical interfaces comprising activable graphics capable to be activated via the bidder computing devices; receive via the computer network, signals from the sales facilitator computing device generated via the sales facilitator graphical interface, the signals relating to: information relating to the item; parameters for controlling the sales process including a cost of buying the item now, a reserve price and a number of time periods; the at least one processor, responsive to the signals, storing the information relating to the item and parameter values in the memory device; start a countdown timer executing in the at least one processor for measuring a first period of time, the at least one processor transmitting via the computer network a signal to each bidder computing devices to display the remaining time for visualisation by the bidders; receive via the computer network, signals from the bidder computing devices via the bidder graphical interfaces, the signals relating to, information relating to the respective bidder including terms of engagement proposed by the bidder and approved by the sales facilitator to enable the bidders to participate in the sales process wherein the terms of engagement includes purchase terms relating to the item of real estate, the at least one processor, responsive to the signals, storing the information and parameter values relating to the signals from the bidder computing devices in the memory device, the at least one processor determining a ranking value for each bidder based on a comparison of the purchase terms proposed by the bidder with preferred purchase terms approved by the sales facilitator and storing said ranking values in the memory device; receive by the server via the computer network, signals from one or more of the bidder computing devices generated in response to bidder activation of a first icon which is activable to allow each of the bidders to input a starting bid for purchasing the item and a second icon displaying a cost of buying the item now which is activable to allow any of the bidders to purchase the item directly; generate and transmit via the computer network a signal to the plurality of bidder computing devices, the signal causing the bidder computing devices to display, once the first icon has been activated by any of the bidders, to each of the bidders via the bidder devices, a third icon which is activable to allow one of the bidders to submit an improved bid which has the value of a bid increment added to the starting or the previously improved bid, the at least one processor storing the improved bid in the memory device; while the first particular period of time is less than a first period of time, iteratively repeating steps a) and b) unless the second icon has been activated by a particular bidder; a) when the first particular period of time is less than a difference between the first and a second time period, then the at least one processor receiving signals from bidder computing devices relating to activation of the third icon thereby allowing the bidder to continuously improve their bid; b) when the first particular period of time is less than a difference between the first and second time periods, impeding the bidders from activating the first or second icons; starting a second countdown timer, executing in the processor, to measure a second particular period of time and iteratively performing the following step of: displaying to each of the bidders via the bidder devices, a fourth icon which is activable to allow a particular bidder to improve their bid; while the second particular period of time is less than the third period of time and the improved bid is less than the reserve price, permitting any bidder to activate the fourth icon to improve their bid; resetting the second countdown timer, executing in the at least one processor, to zero when any improved bid is greater or equal to the reserve price and starting a third countdown timer, by the processor, to measure a third particular period of time, the at least one processor sending a signal to the bidder computing devices to display the remaining time measured by the third countdown timer, and, while the third particular period of time is less than a fourth period of time iteratively performing the steps of: permitting any bidder to activate the fourth icon to improve its previous bid; determining which at least two bidders have the highest improved bids when compared to the other bidders, determining which of the at least two bidders have a higher ranking value; selling the item to one of at least two bidders on the basis of the bidders highest improved bids and/or ranking value.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIGS. 15a and 15b illustrate particular instances of the bidder graphical interface after completion of the bidding period of the sales mechanism shown in FIG. 1;

FIG. 16 illustrates a particular bidding timeline of the sales mechanism shown in FIG. 1;

FIG. 17 shows a table comparing the sales mechanism shown in FIG. 1 against several conventional sales mechanisms;

DESCRIPTION OF EMBODIMENT(S)

Figure 1:
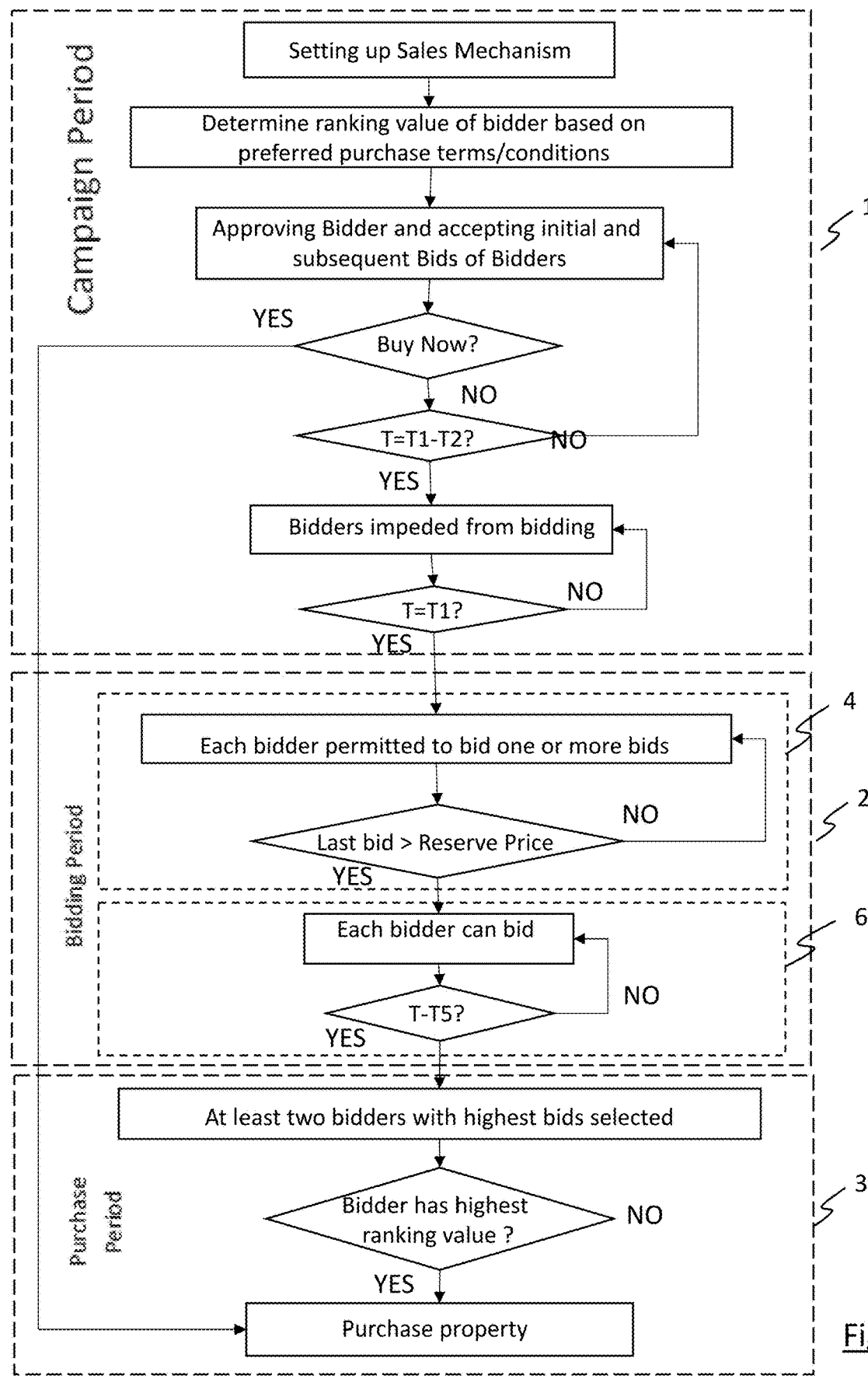
FIG. 1 illustrates a flowchart outlining a sales mechanism in accordance with an embodiment of the present invention.

The invention relates to a system 10 for conducting a sales mechanism over the internet in accordance with an embodiment of the invention.

The system 10 comprises a sales platform 18 for vendors of items such as a real estate property, sales facilitators 16 to administer the sales mechanism, and buyers (also referred to as bidders 14) to interact for selling and buying the items offered for sale. The description to follow will refer to a particular application of the sales mechanism for offering for sale a real estate property; however, the sales mechanism may be utilised for offering for sale any tangible or intangible items that is able to be sold.

In a particular arrangement the system 10 permits the sales facilitator 16 to set up the sales mechanism by, for example, (1) making available via a sales facilitator graphical interface 21 images of the particular items offered for sale, (2) setting up the parameters of the sales mechanism (3) registration of the participants (the bidders 14), and (4) overviewing and updating any parameter of the sales mechanism.

FIGS. 19 to 27 show images of particular instances of the sales facilitator graphical interface 21 during setting up of the sales mechanism and during operation of the sales process.

The system 10 is also adapted to provide to bidders 14 a bidders graphical interface 19. By accessing the bidders graphical interface 19, the bidders 14 may, for example (1) view the particular item that is offered for sale and (2) show an interest in purchasing the particular item by making one more bids for purchasing the particular item offered for sale and to interact with the sales facilitator 16 during the sales process.

FIGS. 5 to 15 shows images of particular instances of the bidder graphical interface 19 during the bidder's registration process into the sales mechanism and during the sales process using the sales mechanism.

Also, the bidders 14 may provide, via the sales platform 18, to the sales facilitator 16 the terms and conditions (referred to as the terms of engagement), these can include purchase terms and conditions, that would become operative in the event that any of the bidders 14 would ultimately make the successful bid and acquire the item offered for sale. Provision of these term may be done over the internet by, for example, uploading writing agreements in digital format, the sales facilitator 16 or vendor 20 accepting these terms over the internet after discussion with the bidder 14 to adjust the terms of engagement to accommodate the needs and desires of all parties.

In accordance with present embodiment of the invention, any bidder 14 may provide terms and conditions of purchase that may differ from each other; this maximizes the potential audience of bidders. Terms and conditions of purchase of the item of real estate can include a settlement period, for example, settlement period is 1, 2 or 3 months, finance terms for example, whether subject to finance or cash payment, whether chattels (fittings or fixtures) are included or excluded, existence of any encumbrances, vacant possession, owner-buyer or investment buy. These terms and conditions of purchase can be pre-approved by the sales facilitator and presented to the bidders which is described in the following paragraphs in more detail.

Figure 2:
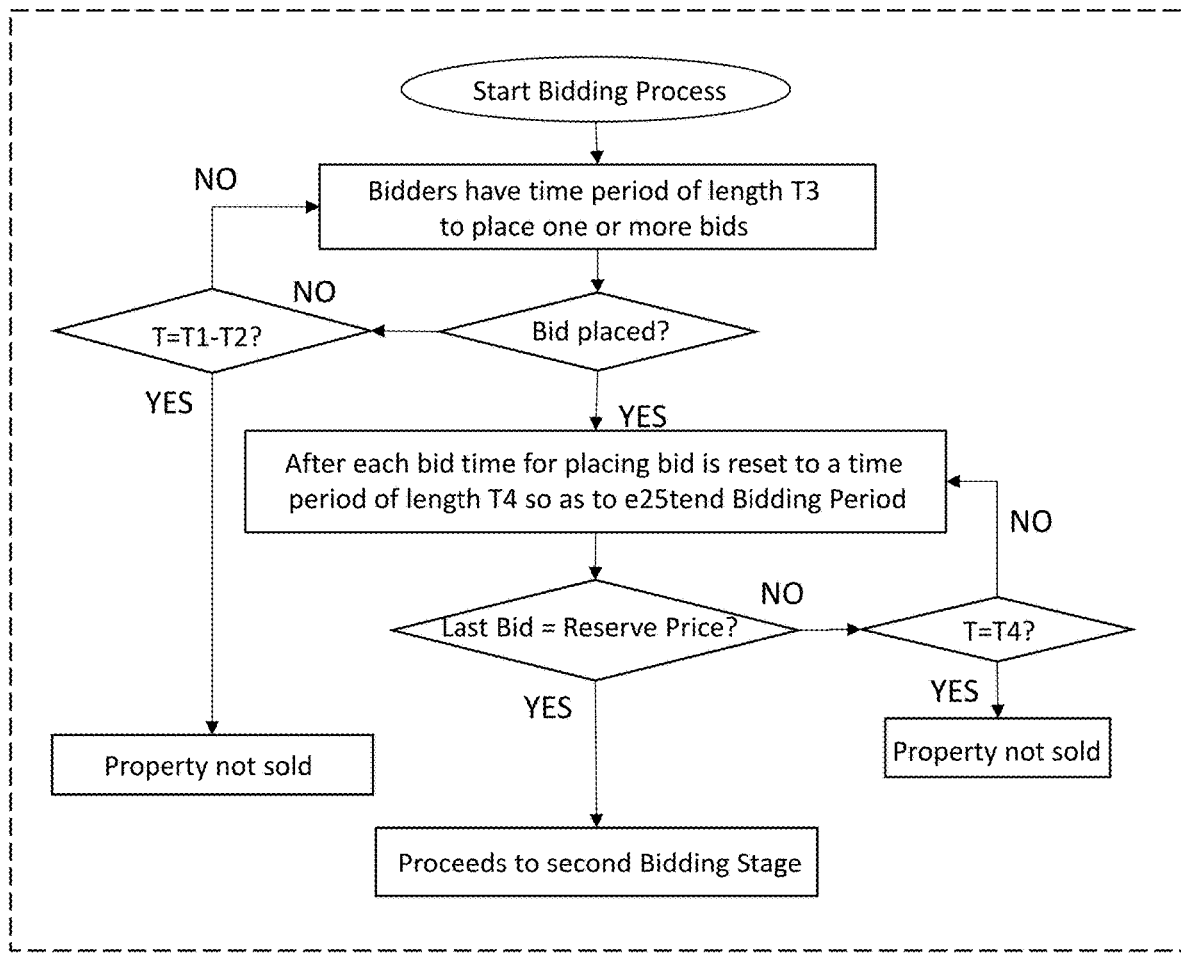
FIG. 2 illustrates a flowchart of a bidding period included in the sales mechanism shown in FIG. 1.
Figure 3:
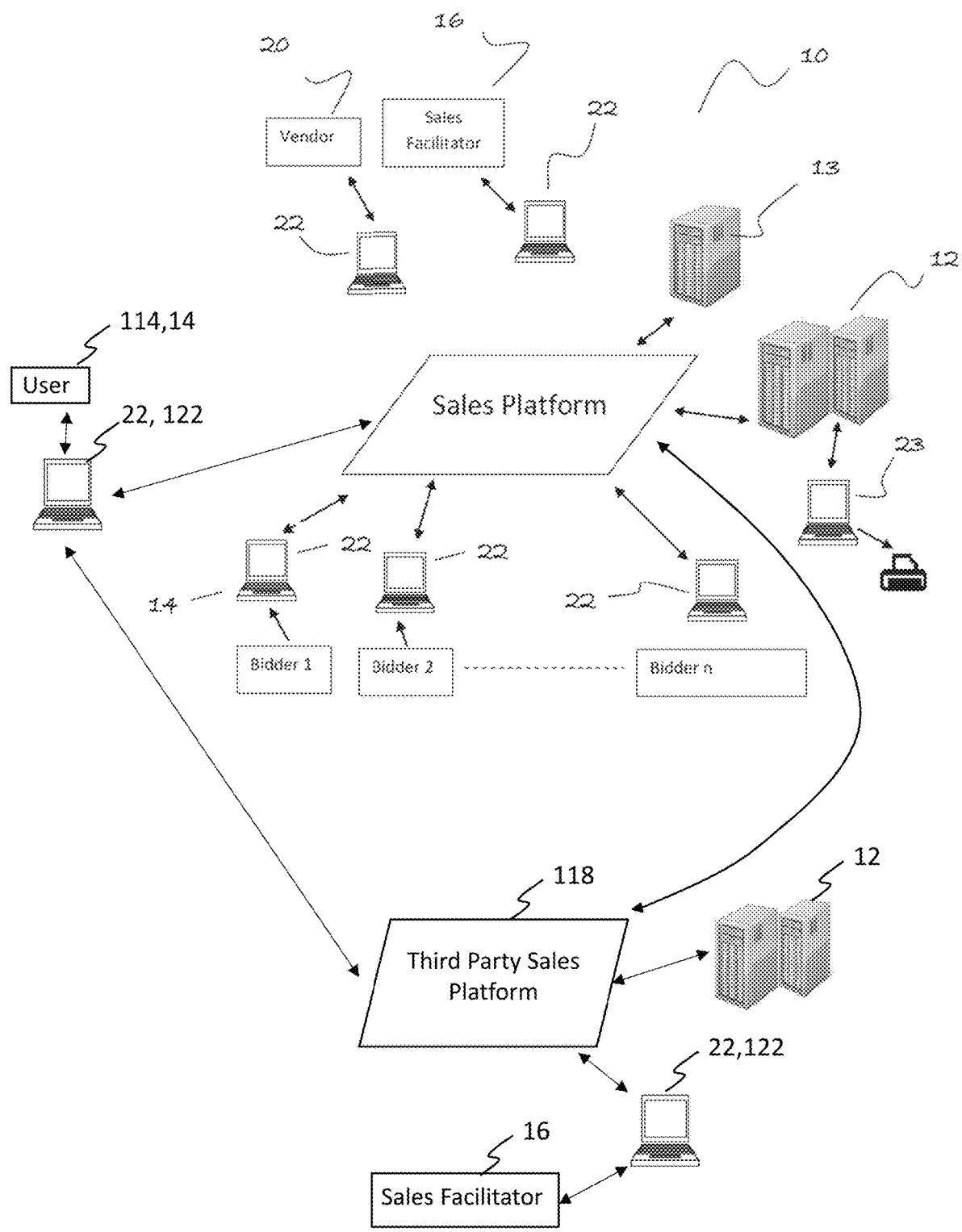
FIG. 3 illustrates a system for performing the sales mechanism illustrated in FIG. 1.

FIGS. 1 and 2 depicts two flowcharts outlining a particular arrangement of a sales process in accordance with an embodiment of the present invention to be conducted over the internet using the system 10 depicted in FIG. 3.

The sales mechanism comprises a first stage (referred to as the Campaign Period 1) a second stage (referred to us the Bidding Period 2) and a third stage (referred to as the Purchase Period 3).

The campaign period comprises the steps of (1) setting up the sales mechanism, (2) approval of bidders 14 including agreeing on the particular terms of engagement that would become operative in the event that any of the bidders 14 concerned would ultimately make the successful bid, and (3) the bidders 14 making one or more bids. The campaign period can also include a 'pre-bidding' period before any bids are made where the vendor 20 can specify their preferred purchase terms and conditions, and where the bidder 14 can select which of these pre-approved purchase terms and conditions they wish to accept, and which assigns them a ranking value which indicates their alignment with the preferred purchase terms and conditions. Once the time of the campaign period T1 has expired, all approved bidders 14 are registered and can begin the 'bidding' period.

The bidding period consists of two parts. In the first part of the bidding period, there are several time periods in which the bidders 14 can make a starting bid and improve on their bid by a selected bid increment until the item reserve price is reached. They can do this via the bidders interface 19, which presents them with a graphical interface of the sales process and activable icons by which to make bids and increase their bids. The bidders 14 continue to bid increments until the reserve is reached, at which point a further part of the bidding period commences where bidders 14 can now increase their bids for purposes of purchasing the item. At the end of the time period (T5) allotted for the further part of the bidding period, the top bidders, which may be at least two bidders having the highest bids, can continue into the next period, the 'purchase' period. There the sales facilitator 16, in communication with the vendor 20, can select which of the top bidders 14 will be the purchaser, which can be dependent on both or either of the amount of the highest bid and ranking value associated with each bidder 14. In this way, the sales process advantageously provides a mechanism for facilitating the preferred purchase terms as selected by the vendor 20 as the bidders 14 are encouraged to adopt the preferred purchase terms to provide them a positive edge in purchase of the item.

As discussed above in a previous paragraph, the terms of engagement can include terms and conditions of purchase of the item of real estate. The sales facilitator can select which purchase terms and conditions are preferred, and this can be presented to the bidders for approval. Depending on whether all or none or a selected number of the purchase terms and conditions are approved by a bidder, a ranking value can be assigned to a bidder which relates to their acceptance of purchase terms. This ranking value can be influential to the sales process as discussed further below. The selection, approval and determination of the ranking value of the bidder 14 can be made in a period before any sales action is commences, a so-called 'pre-bidding' or 'pre-purchase' period in the Campaign Period 1.

Further, during the campaign period 1, the sales mechanism also includes the option (referred to as "Buy Now" option) for permitting any of the bidders 14 to purchase the item offered for sale at a particular pre-established price (the Buy-Now Price) prior commencement of the bidding period 2. The Buy-Now Price progressively decreases as time goes by and as the bids made by the bidders 14 increases in value. If a particular bidder 14 decides to purchase the property by choosing the Buy-Now option, the bidding period 2 is skipped and the purchase period commences exclusively between the particular bidder and the sales facilitator 16. If for any reason, the property is not sold, the sales process may be restarted.

The Buy-Now option may be removed at the discretion of the sales facilitator 16. For example, if the quantity of bidders 14 registering to the sales mechanism is relative large and thus, existing a relative great demand for the property) the Buy-Now option may be removed. However, the Buy-Now option may be reinstated during the campaign period if required or desired. Removal and reinstatement of the Buy-Now option may be done by the sales facilitator 16; for this, the system 10 causes the sales facilitator graphical interface 21 to allow the sales facilitator to remove or reinstate the Buy-Now option through activation of particular icons adapted to remove or reinstate the Buy-Now option when activated by the sales facilitator 16.

In alternative arrangements, the system 10 may comprise means for deciding (independently from the sales facilitator) when to remove or reinstate the Buy-Now option based on, for example, information (such as Big Data) collected from previous sales processes. These means may be based on algorithms designed to that effect.

In a further alternative arrangement, the Buy-Now option may be removed if the Buy-Now price (that is continuously decreasing during the campaign period of the sales process) shown in the icon 28 displayed in the bidder graphical interface 19 is equal to the Buy-Now end price.

In another arrangement, there may also be provided an option for the sales facilitator 16 to commence the bidding period prior the end of the campaign period 1 should a particular offer for purchasing the item be received. The particular offer may be, for example, a bid that is equal to or greater than the reserve price. The reserve price is a specific price of the item to be offered for sale set by the vendor 20 and/or the sales facilitator 16; for example, the reserve price may be the minimum price of the item that is being offered for sale at which the item will be sold.

In the particular arrangement described in the previous paragraph, the campaign period 1 may be stopped and the bidding period 2 is started upon the sales facilitator 16 and/or the vendor 20 discretion. However, in contrast, in the particular arrangement shown in FIG. 1, the campaign period 1 occurs within a pre-set time frame T1 (the first time period T1). The vendor 20 and/or the sales facilitator 16 may decide the duration of the first time period (T1) prior setting up of the sales mechanism by the sales facilitator 16. The first time period may more than a week or a month depending on, for example, the demand of the particular property to be sold.

Further, during the campaign period 1, the bidders 14 may make as many bids as desired; however, in the particular arrangement shown in FIG. 1, the bidders 14 are impeded from bidding for a pre-set time frame T2 (the second time period) prior commencing of the bidding period 2. The presence of this second time frame T2 may be particularly advantageous because it allows each bidder 14 to review the bids that have been made by all bidders (and that are visible to each bidder 14 through the bidder graphical interface 19) to, for example, asses her/his position and review in greater detail the particular property that is being offered for sale before going to the next stage, which is the bedding period 2. In an arrangement, the second time period may be 2 minutes.

As mentioned before, upon lapsing of the second time period T2, the bidding period 2 commences and the bidders 14 are permitted to make bids again. As shown in FIG. 1, the bidding period 2 comprises a first bidding stage 4 and a second bidding stage 6.

FIG. 2 illustrate the first bidding stage 4.

As shown in FIG. 2, the first bidding stage 4 permits the bidders 14 at the end of the campaign period 1 to increase their bids with respect to the value of their last bid. In this first bidding stage 4, the bidders are allowed to bid during the duration of a third period of time T3; upon lapsing of the third period of time T3 and no bid has been placed, the property may either (1) not be sold or (2) be sold to the bidder 14 with the highest bid at the end of the campaign period 1. However, it is expected that upon commencement of this first bidding stage 4, the bidders 14 will bid with the objective of purchasing the property. In an arrangement, the third time period may be 5 minutes.

In particular, it is expected that during the first bidding stage 4 one of the bids made by a particular bidder 14 will be equal or greater than the reserve price.

In a particular arrangement, the time period set for the first bidding stage 4 to laps (that initially is the third period of time T3 mentioned in the last paragraph) is reset to a fourth time period of time T4; resetting of time period occurs each time a bid is made by one of the bidders 14. In this manner, the first bidding stage 4 may be extended beyond the third period of time T3 until a bid of a particular bidder 14 is equal or greater than the reserve price. In an arrangement, the fourth time period may be 2 minutes.

In the event where a bid made by a bidder 14 is equal or greater than the reserve price, the second bidding stage 6 commences as illustrated in FIG. 1.

In accordance with a particular arrangement, upon a particular bid being equal or greater than the reserve price, a notification is issued to the bidders 14 and to the Sales facilitator. The notification includes information regarding the fact that the reserve price has been met and the item is on the market and will sell. For example, a notification may in the form of a pop-up window 76 (such as a red banner shown in FIGS. 12 to 14 and FIGS. 27b and 27c) being displayed in a graphical interface of a computing or communication device having installed therein an app of the sales mechanism. Upon appearing of the notification, the second bidding stage 6 commences.

In the second bidding stage 6, all bidders 14 have an opportunity to bid; however, no bidder 14 can bid against her(him)self by submitting consecutive bids. The duration of the second bidding stage 6 is pre-set to be a fifth period of time T5. This pre-set time period may not be extended; however, the second bidding stage 6 may be paused by the sales facilitator 16. Pausing of the second bidding stage 6 may occur to, for example, vary the amount that each bidder 14 may increment its earlier bid. This can be seen in FIGS. 12*b* and 13.

After lapsing of the sixth period of time T6, the second bidding stage 6 is stopped and the bidder 14 with the highest bid (the winning bidder 14) purchases the item through during the Purchase Period 3.

In a preferred embodiment, after lapsing of the sixth period of time T6, the second bidding stage 6 is stopped and at least two bidders 14 with the highest bid (the top bidders) can be displayed together with their ranking values which have been established in the Campaign Period. The winner bidder 14 may be one of the top bidders 14 with a higher ranking value depending on a selected arrangement by the sales facilitator 16. In a pre-determined arrangement, if the difference between the highest bids of the top bidders 14 is less than a predetermined amount, i.e. <than $10k, then the winning bidder 14 may be selected on the basis of their higher ranking value. Alternatively, the sales facilitator 16 may select the winning bid after discussion with the vendor 20. This allows the vendor 20 to preferentially select a purchaser where the purchase terms are in better or best agreement with their preferred purchase terms and conditions and to compel or encourage bidders 14 to agree with preferred terms and conditions.

The sales facilitator 16 may select display of the ranking value in each of the bidder interfaces, for example, in the icon which represents the bidder 14 or the icon which represents the bid of the bidder 14. The sales facilitator 16 may also be able to select between displaying or concealing the ranking value of each bidder 14 in the display.

In an arrangement, in the event that the winning bidder 14 or top bidders 14 do not purchase the item, the other bidders 14 will be contacted in the order of the last bids; this is, other bidders 14 will be contacted in accordance with the value of their bid from the second highest bid to the lowest bid. Again, the winner of the other bidders 14 may be selected, not only on the basis of the amount of their highest bid but also on their ranking value.

Figure 4:
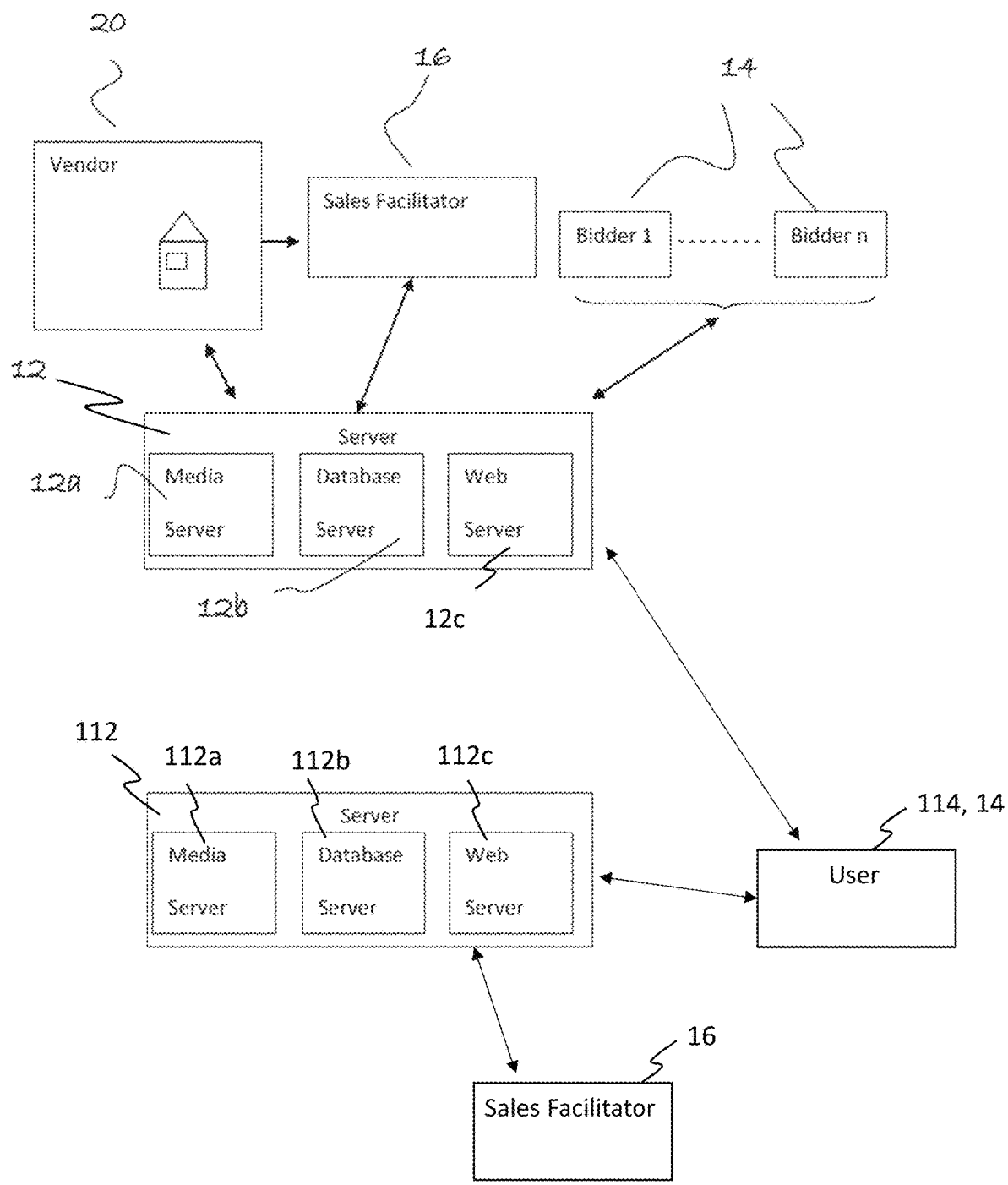
FIG. 4 illustrates a system for setting up the sales mechanism shown in FIG. 1.

Referring now to FIGS. 3 and 4.

FIG. 3 illustrates an online, real-time system for conducting a sales mechanism according to the present embodiment of the invention.

The system 10 includes a server 12 including software for running the Sales Platform 18 and one or more computer processors, such as one or more commercially available Central Processing Units (CPUs) in the form of one-chip microprocessors, coupled to a communication device configured to communicate via a communication network. The communication device may be used to communicate, for example, with one or more of the remote devices 22 and 23 as well as server 13 adapted to communicate with the remote device 22 of the sales facilitator 16 and the bidders 14.

The Sales Platform 18 further comprises input devices (for example, a mouse and/or keyboard to enter persona details among other) and an output device (for example, a computer monitor to display reports and/or aggregated results to an administrator and permit the administrator to manage and control the sales platform 18 and a printer 25 for printing of reports and any valuable information).

Further, the system 10 includes computing means having data sharing software program installed and/or directly integrated within the system 10. The computing means comprise electronic devices that include the laptops 22 and 23 (or PC and similar computing and communication devices such as mobile phones) and servers 12 and 13. The computing means each include at least one CPU and operating system, RAM, ROM storage and TCP/IP adapter card. Computing means are each coupled to input and output (I/O) devices through an I/O interface. The I/O interface includes any system for exchanging information to or from an external device. I/O devices include any known type of external device such as a display device (e.g., monitor including touch-screens), keyboard, mouse devices, printer, speakers, handheld device, facsimile, microphone, or webcam.

The Sales Platform 18 further includes database farms incorporated in the serves 12 and 13. The database farms store information required for the sales platform 18 to generate the graphical interfaces such as 19 and 31, running the sales process and issuing reports.

The server 12 comprises a media server 12*a*, a database server 12*b*, and a web server 12*c* shown in FIG. 4. In alternative arrangements the media, database and web servers may be virtualized on one or more physical servers or may all be performed by a single server.

The system 10 is also capable of communicating, via the network, to an Third Party Sales Platform 118 which includes a server 112 including software for running the Third Party Sales Platform 18 and one or more computer processors, such as one or more commercially available Central Processing Units (CPUs) in the form of one-chip microprocessors, coupled to a communication device configured to communicate via a communication network. The communication device and network may be used to communicate, for example, with one or more of the remote devices 122 and 123 as well as server 113 adapted to communicate with the remote device 22 of the sales facilitator 16 and a user 114.

The Third Party Sales Platform 118 is a separate entity to that operating Sales Platform 18 of system 10 and has the function of being able to present sales of items, such as items of real estate, from multiple platforms, such as real estate websites operated by different entities, including similar or the same items as those in the Sales Platform 18. The Third Party Sales Platform 118 could be an aggregate type platform which draws sales of items from multiple other platforms and presents them together in at least one listing or multiple listings.

Similar to Sales Platform 18, the Third Party Sales Platform 118 can have computing means including laptops 122, 123, which have CPUs, RAM, ROM storage and TCP/IP adapter cards which can couple to input and output devices examples of which are discussed in previous paragraphs. Servers 112 and 113, similarly to servers 12 and 13 can include database farms which generate the graphical interfaces, aggregate sales of items and issue reports, and can include a media server 112*a*, database server 112*b* and webserver 112*c* as shown in FIG. 4. The media server receives and stores images, video and/or audio taken by a media device by, for example, the sales facilitator 16 of the item offered for sale. This allows the users 114 to visualise the item to be sold through, for example, a website interface 118. The Third Party Sales Platform web server generates a graphical interface (not shown) for the sales facilitator 16 to use so that the sales facilitator 16 can request that the item for sale in the Sales Platform 18 is also listed on the Third Party Sales Platform 118. In another embodiment, the item for sale is automatically aggregated from the Sales Platform 18 and displayed for sale in the Third Party Sales Platform 118 without requiring intervention from the sales facilitator 16.

The media server receives and stores images, video and/or audio taken by a media device by, for example, the sales facilitator 16 of the item offered for sale. This allows the bidders 14 to visualise the item to be sold through, for example, a website interface 18. In particular arrangements, video images and audio signals of the sales facilitator 16 during a particular sales mechanism may be provided to the media sever for storage therein to allow visualization of a live sales mechanism by the bidders 14 through the website interface 18.

Similarly, the Third Party media server receives and stores images, video and/or audio taken by a media device by, for example, the sales facilitator 16 of the item offered for sale or retrieves it automatically from the website interface/Sales Platform 18. This allows the users 114 to visualise the item to be sold through on the third-party website interface 118.

The Third Party server is also able to provide an icon, preferably adjacent to or in near proximity, to the media of the item offered for sale on the Third Party Sales Platform 118, where the icon is labelled 'Buy Now'. The icon is activable by a user 114 on a user computing device 122, and when so activated, the server generates a command and/or a website address of the Sales Platform 18 to the user computing device 122 so that the user computing device 122 starts the Sales Platform website interface 18 or navigates to the website, via the website address provided, on a browser on the user computing device 122. There the user 114 can thus progress on the Sales Platform 18 as a bidder 14. For example, an application programming interface (API) can be provided to facilitate integration and communication between the third party platform 118 and the system 10. This can enable a button or icon to be displayed on the third party platform (such as an aggregating real estate listing service) to indicate the availability of the sales mechanism for the property and enable potential bidders to link to the sale mechanism by clicking the button or icon. Responsive to this user action a signal is automatically generated and transmitted to the system 10. This may also open a portal within the third party web page or alternatively a new web page to enable the bidder to enter details as discussed above.

In an alternative arrangement, once the app 18 or Sales Platform 18 is displayed to the user 114 after activation of the 'Buy now' icon on the Third Party Sales Platform 118, the Sales Platform 18 can display to the user 114 the 'Buy now' icon so that the user 114 can bypass the sales process altogether and purchase the item directly.

The web server generates a graphical interface 21 for the sales facilitator 16 to, for example, (1) setting up the sales mechanism and interact with the bidders 14 (or users 114 who have become bidders) during, for example, registration of the bidders 14 prior commencement of the bidding process and (2) for controlling the progression of the bidding process.

Further, the web server also generates a graphical interface 19 for the bidders 14 for, for example, registration purposes, viewing images of the item offered for sale and for participating in the bidding process. In alternative arrangements, the bidder graphical interface 19 may be generated by a software application (referred to herein as app) installed in a portable computing and communication device of all participants of the sales mechanism.

The data base server stores data of the sales mechanism (e.g., bid data, user names, passwords, account information, item offered for sale data, etc.) provided by the web server prior and during the sales mechanism.

The graphical interfaces 19 and 21 are generally served by the web server. Images, video, and audio from the media server may be downloaded or streamed by the bidders 14 directly from the web server (e.g., the downloaded webpage providing embedded media from the media server's address).

The sales facilitator 16 and the bidders 14 interact with the sales platform 18 via computing device adapted for sending and receiving data with the website 18. Similarly, the sales facilitator 16 and the users 114 interact with the sales platform 118 via computing device adapted for sending and receiving data with the website 118. The computing devices comprise (1) processors adapted to execute code or other instructions and communicate over LAN/WAN; (2) a display for displaying graphical user interfaces such as the website 18, 118; (3) an input device such as keyboards, touch screens or mouse devices. Each of the computing devices are adapted to operate a web browser for displaying the website interface 18, 118 of the system 10 for conducting the sales mechanism. Alternatively, the computing devices 22, 122 (such as a cellphone) may be adapted to use stand-alone applications (apps) that have been downloaded from the webpage of the sales mechanism and installed in the computing device 22, 122.

The computing devices 22, 122 may be any of, for example, a personal computer, a cellphone and a laptop.

As mentioned before, the system 10 allows a sales facilitator 16 to set up a sales mechanism to allow a plurality of bidders 14 to participate in the sales mechanism via the website interface 18. Further, the system 10 is adapted to communicate with a third party platform 118 which allows users 114 to be directed to the sales mechanism on website interface 18, either to buy the item directly or to become bidders to participate in the sales mechanism.

In alternative arrangements, the system 10 may be adapted to conduct a real-time sales mechanism spanning a particular period of time. The real-time sales mechanism may be conducted with a plurality of remote bidders viewing simultaneously a graphical interface 19 (or the app interface displaced in their cellphones) and participating remotely in the live sales mechanism. For this, the sales facilitator 16 may use a camera for filming the live sales mechanism by recording video and audio signals of the sales mechanism and provide the video and audio signals to the media server for display on the website 18 for viewing by the bidders 14.

Furthermore, the vendor 20 of the item offered for sale may directly communicate with the sales facilitator 16 via a computing device 22 to provide images and details of the item offered for sale and further to provide input on preferred purchase terms and conditions, for example, settlement period, chattel, vacant possession, finance terms and the like. Alternatively, the vendor 20 may communicate with the sales facilitator 16 via the sales platform 18 though a particular graphical interface generated by the web server; for this the vendor 20 may logon on the vendor's interface of a vendor graphical interface for storing the image and details of the item offered for sale in the media server of the server 12 to permit the sales facilitator 16 and the bidders 14 to view the image and details of the item offered for sale via the website 18 prior to the bidding process. The Third Party Sales Platform 118 may retrieve the image and details of the item offered for sale from server 12 and generates a listing from the image and details on website/platform 118 prior to the bidding process.

The server 12 may generate particular instances of graphical interfaces being displayed on screens of computers, laptops or mobile phones having installed therein an app of the sale mechanism. These graphical interfaces (the sales facilitator, bidders and vendor graphical interfaces) permit the sales facilitator 16, vendor 20 and the bidders 14, users 114 to interact with the system 10 via keyword, mouse or touch-screens for activating particular icons shown in the graphical interfaces to provide instructions and issue requests to the system 10 during operation of the sales mechanism.

In an arrangement, there is provided the step of permitting the sales facilitator to pause the sales mechanism.

Referring now to FIGS. 5 to 15.

FIGS. 5 to 15 show particular instances of the bidder graphical interface 19 during the sales process of the item offered for sale; in particular, the sales process of real estate property (referred to as the property).

In the particular arrangement shown in FIGS. 5 to 15 the bidder graphical interface 19 is showed in a display of mobile phone via an app installed in the mobile phone of the bidders 14.

As will be described with reference to FIGS. 19 to 27, the sales facilitators 16 may set up the sales mechanism and overview the sales mechanism via a graphical website interface 21 showed in a display of a computing device or a mobile phone having installed an app of the sales mechanism. Similarly, the vendor 20 may overview the sales process together with the sales facilitator 16 or the vendor 20 may remotely overview the sales process via a computing device or an app installed in a cellphone in, for example, the privacy the vendor's home.

As was mentioned before, the sales mechanism in accordance with the present embodiment of the invention includes a campaign period 1 that includes the steps of setting up the sales mechanism.

The step of setting up the sales mechanism is illustrated in FIGS. 19 to 22.

Setting up the sales mechanism comprises providing to the web server 12 digital files representing the images 50 and details 52 of the property 50 to be sold in order for the bidders 14 to view via the graphical bidder interfaces 19. This process is referred to as Create Property. Simultaneous to this or shortly thereafter, the Third Party Sales Platform 118 may retrieve the image and details of the item offered for sale from server 12, or the sales facilitator 16 may provide the image and details to the Third Party Sales Platform 118 and generates a listing from the image and details on website/platform 118 prior to the bidding process. Provision of the images 52 and details 52 may be conducted by the vendor 20 or sales facilitator 16 through their respective graphical interfaces by uploading the digital files from the web server of the system 10.

At this stage, the vendor 20 may also be able to indicate preferred terms and conditions of sale of the item via their graphical interface. This may be done by having a number of drop-down lists, pick lists or other such fields which have terms which allow the vendor 20 to select which terms are preferred, approved or both. A database may store a set of term options and attribute which can be presented to the user as pick lists, and in response to user input the selected terms are stored for the sales process for the property. For example, the vendor 20 may be able to check a box or radio button which indicates whether a preferred settlement period is 1, 2 or 3 months, or whether or not particular finance terms, vacant possession, chattel are approved. Each individual term can be provided with a term value or weighting factor. A seller may select more than one option or attribute for each term indicating preference via the weighting factor. For example, a 1 month settlement period could have a term value of 2, 2 month settlement period could have a term value of 1, and 3 month settlement period could have a term value of 1. These term values will be used later in the sales process to determine which winning bidder 14 has preferred terms as will be described in more detail in following paragraphs.

Figure 19:
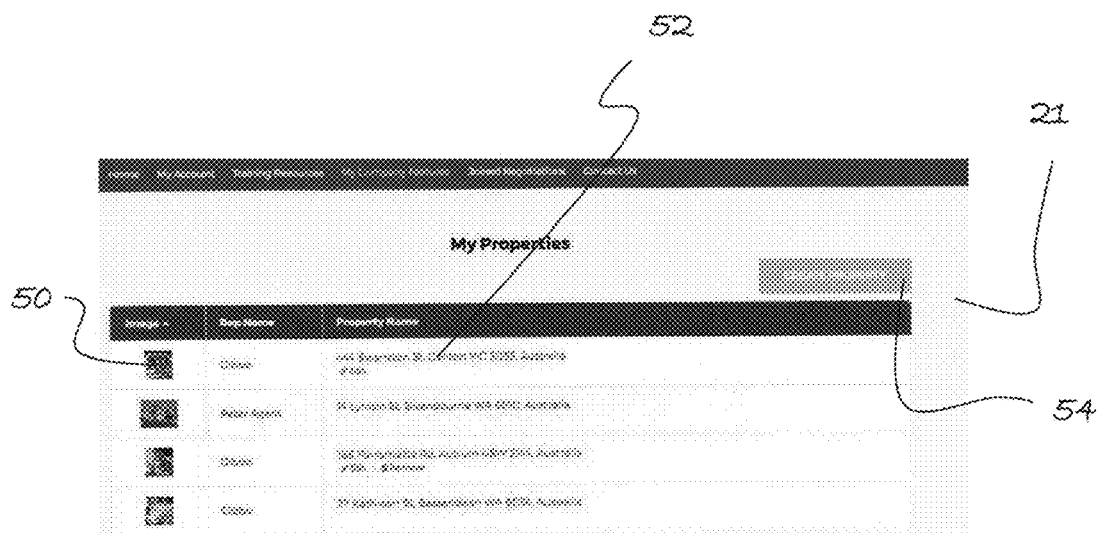
FIGS. 19 to 20 illustrate two particular instances of the sales facilitator graphical interface for permitting creating one or more properties to be offered through the sales mechanism.
Figure 20:
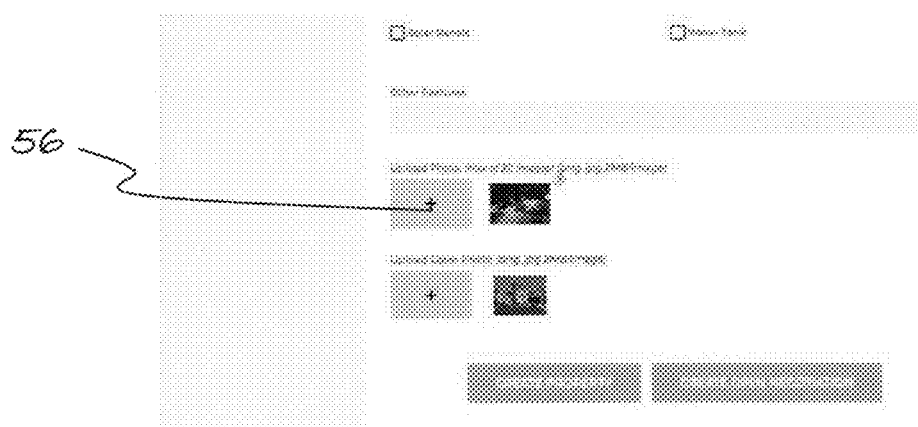

The particular instances of the sales facilitator graphical interface 21 for uploading the digital files are shown in FIGS. 19 and 20. In particular, the instance of the sales facilitator graphical interface 21 shown in FIG. 19 permits commencing the process for uploading the digital files by activating the icon 54 so as to generate the interface of the sales facilitator graphical interface 21 shown in FIG. 20. Activation of the icons 56 allows the sales facilitator to upload onto the server 12 the digitals files so that the bidders 14 may view them through their graphical interfaces 19.

Further, after creation of the property it is necessary setting up the sales mechanism. Setting up the sales mechanism comprises inputting the parameters that are required for operation of the sales mechanism. Examples of these parameters are: the time periods T1 to T5, reserve price, Buy-Now start and end prices, and the bid increment and the maximum single bid that a bidder 14 may make each time.

Figure 21:
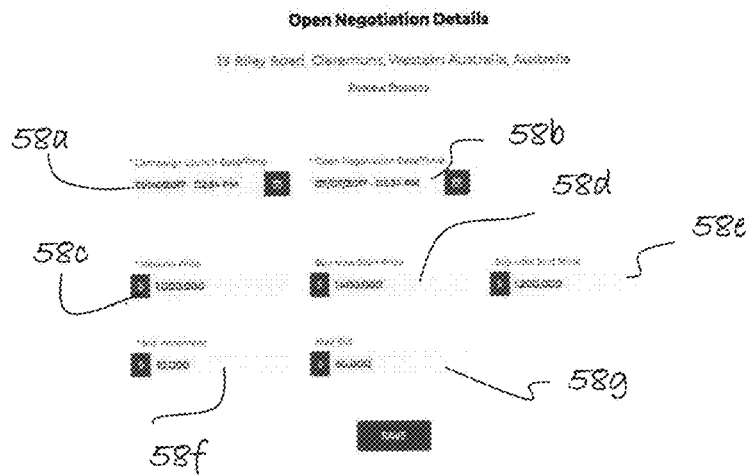
FIG. 21 illustrates a particular instance of the sales facilitator graphical interface for setting the value of particular parameters of the sales mechanism.
Figure 22:
FIG. 22 illustrates a particular instance of the sales facilitator graphical interface for uploading onto a server of the system shown in FIG. 3 digital information of one or more properties to be offered through the sales mechanism and payment of corresponding fees.
Figure 23:
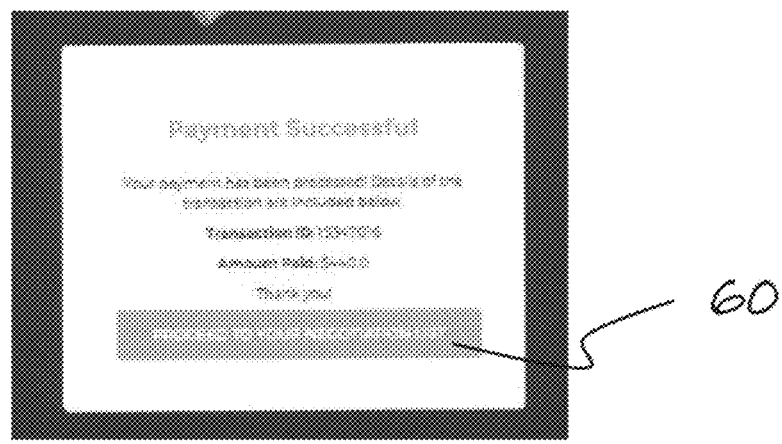
FIG. 23 illustrates a particular instance of the sales facilitator graphical interface confirming uploading of the digital information and that payment has been successful.

A particular arrangement of an instance of the sales facilitator graphical interface 21 is shown in FIGS. 21 and 22. Inputting of these parameters may be done via text boxes 58 as shown in FIG. 21 such as drop-down text boxes permitting the sales facilitator to choose the appropriate value of the parameter from the drop-down list. The time period T1 may be entered by entering in two textboxes 58a and 58b the start date and time of the Campaign Period 1 and the end date and time of the Campaign period 1. The time periods T2 to T5 may be entered via drop-down text boxes permitting the sales facilitator to choose the appropriate value of the parameter from the drop-down list.

Furthermore, the text box 58c permits inputting the reserve price (this is the particular price at which the property will sell) Once inputted the reserve price is kept confidential impelling the bidders 14 to find out the amount of the reserve price.

After, creating the property and inputting the parameters for operation of the sales mechanism, the sales facilitator 16 finishes the process of setting up the sales mechanism by payment of any fees for using the sales mechanism. This is done through the arrangement of an instance of the sales facilitator graphical interface 21 shown in FIG. 22. The instance of the sales facilitator graphical interface 21 shown in FIG. 23 confirms that payment has been successful and provides the corresponding confirmation details; this particular instance comprises a button 60 that by activating it generates the instance of the sales facilitator graphical interface 21 listing all property that has been created by the particular sales facilitator 16. The listing 59 includes an image 62 of the property, the representative and property name and the status of each sales process for each property listed therein.

Figure 25B:
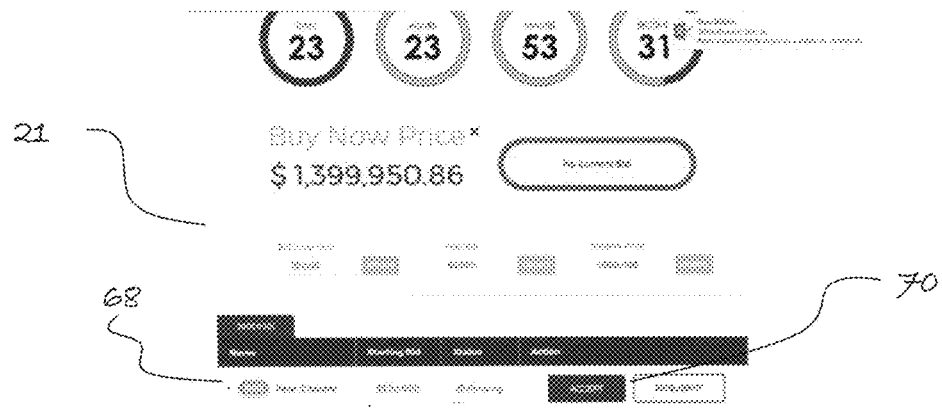
Figure 25C:
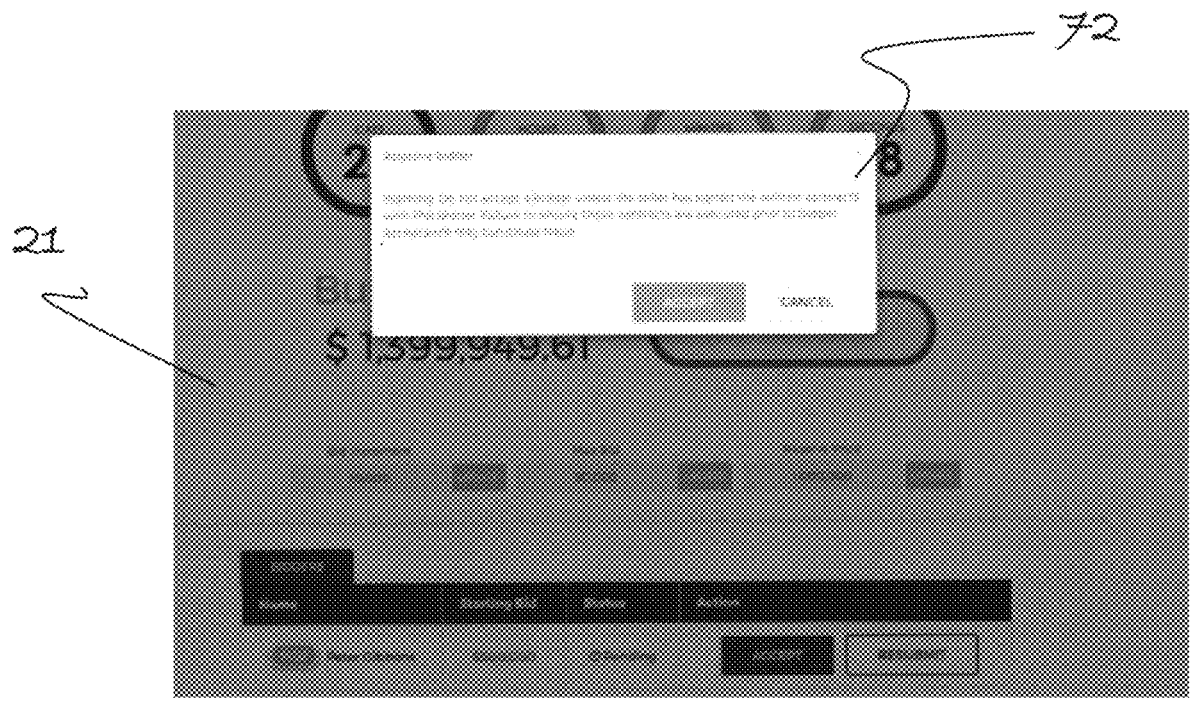
Figure 25D:
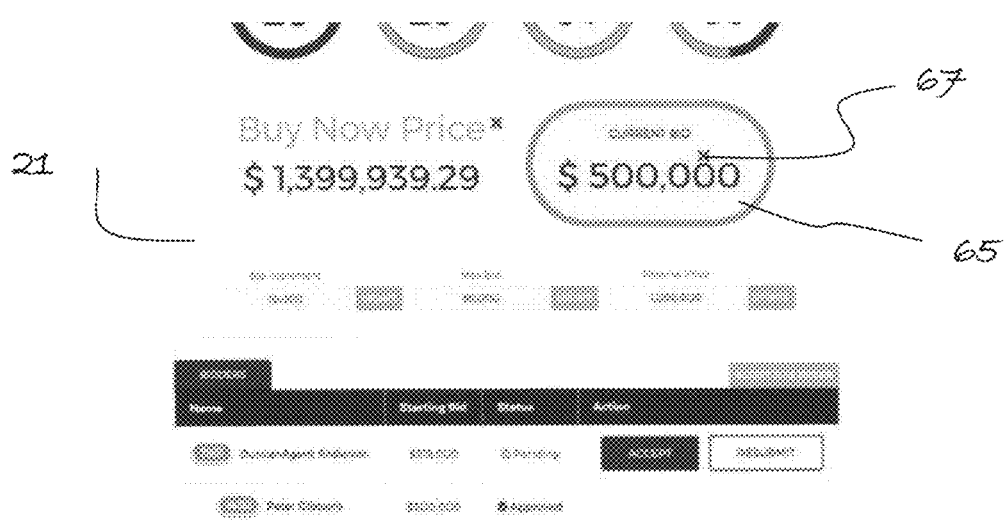
Figure 25E:
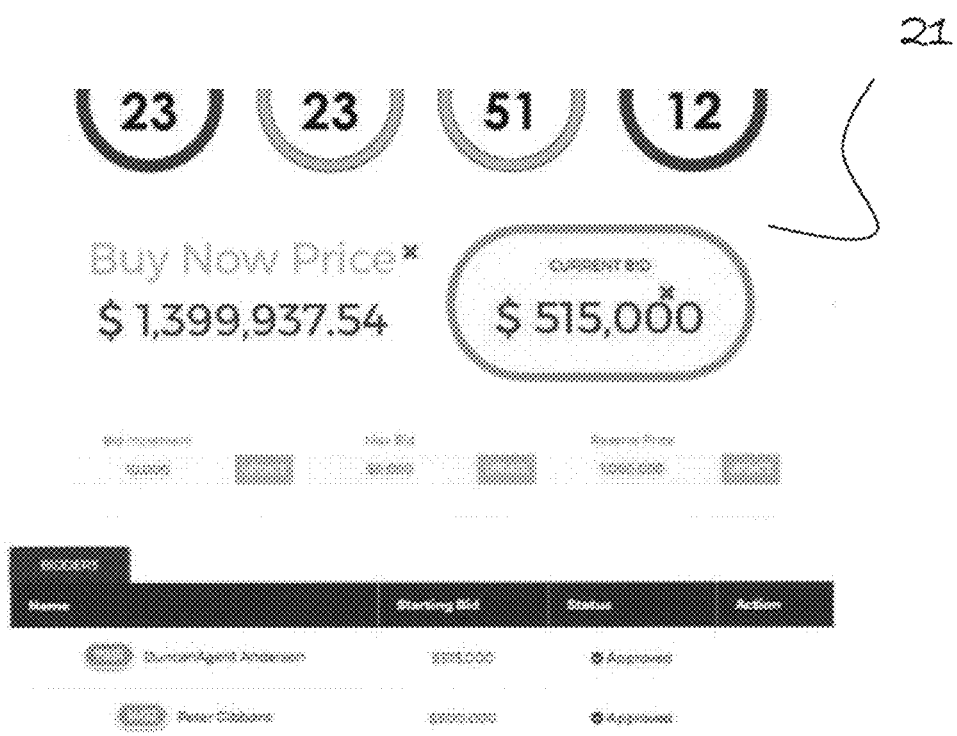
Figure 25F:
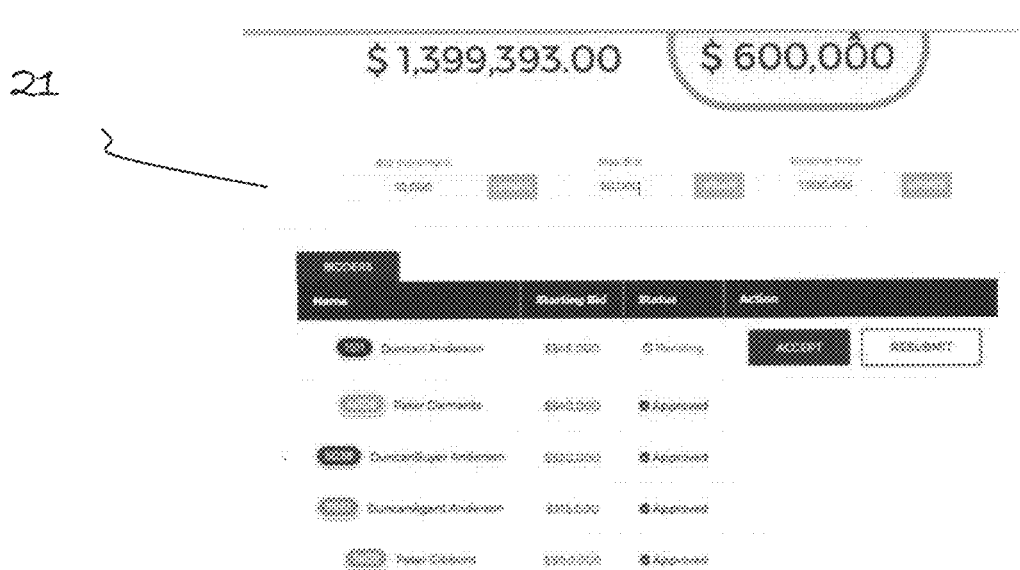
Figure 25G:
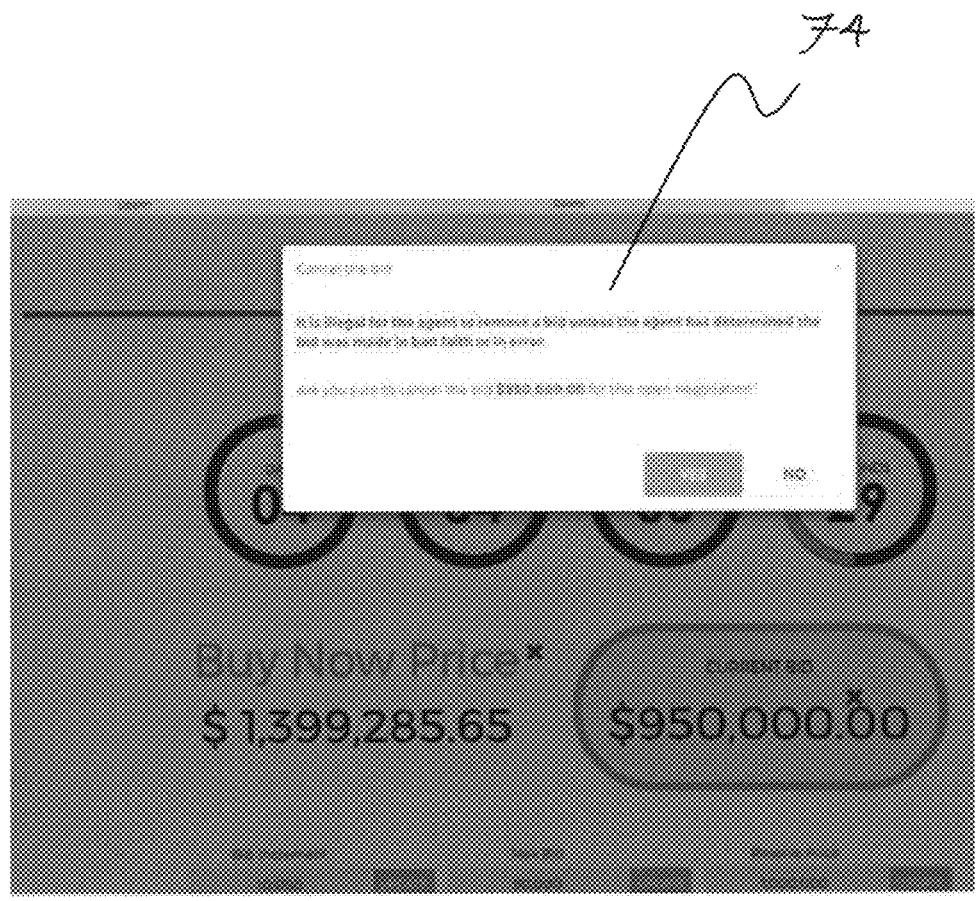
Figure 26:
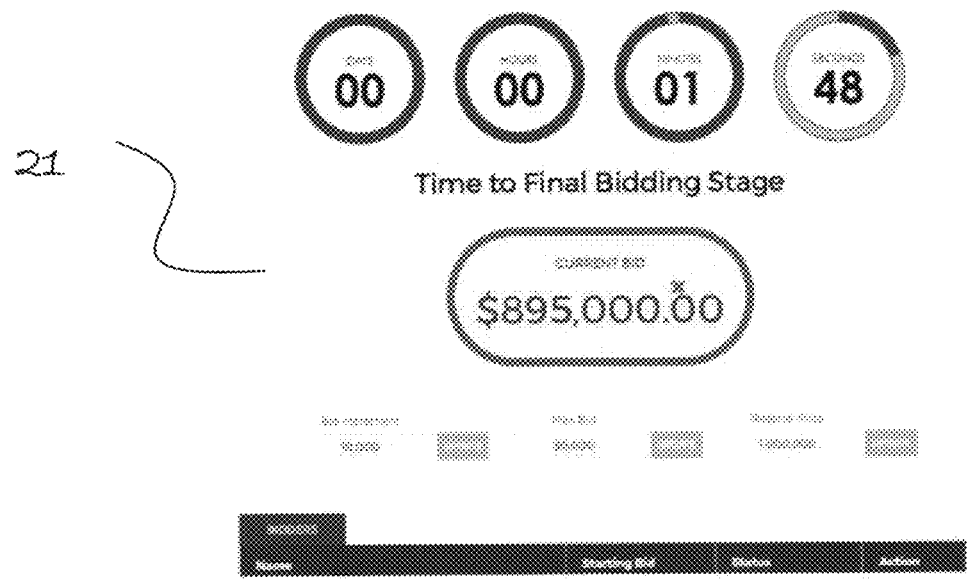
FIG. 26 illustrates a particular instance of the graphical sales facilitator's interface notifying the sales facilitator that the campaign period has finalised and that within a particular time period the bidding period will start.

Referring now to FIGS. 25 to 27, FIGS. 25 to 27 illustrates particular instances of the sales facilitator graphical interface 21 that are displayed in the screen of sales facilitator's remote device 22.

The particular instances of the sales facilitator graphical interface 21 shown in FIGS. 25 to 27 include icons adapted to provide information related to the current status of the sales process.

Figures 24, 25A:
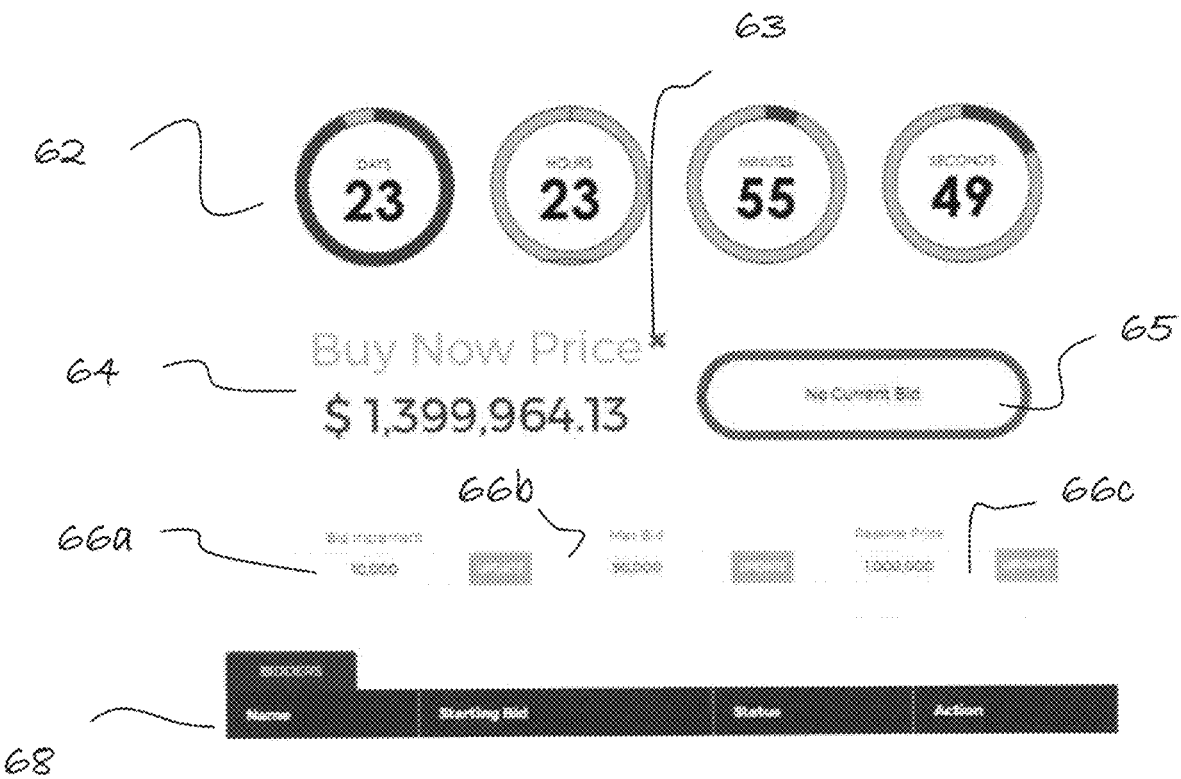
FIG. 24 illustrates a particular instance of the graphical users interface listing the one or more properties offered through the sales mechanism.
FIGS. 25a to 25g illustrates particular instances of the sales facilitator graphical interface permitting the sales facilitator to accept or reject one or more bidders.

As shown in FIG. 25a, the particular instances of the sales facilitator graphical interface 21 may include: (1) one or more icons 62 indicating the value of the time periods Ti (where i is any number 1 to 5). In the instance shown in FIG. 25a, the icons 62 including count-down timers indicate the time left before the campaign period 1 finishes; (2) an icon 64 shows the Buy-Now price; (3) an icon indicating the value of the current bid or if any bid has been already made by one of the bidders 14; one or more icons indicating the values of some of the parameters used for operation of the sales mechanism such as bid increment, maximum bid and the reserve price; and (4) a table listing the bidders 14 with information related to the value of the starting bid, status and a column including one more icons 70 (see FIG. 25b) for each bidder 14.

The icon 28 showing the buy now price in the bidder's graphical interface may be removed by the sales facilitator by activating the activable graphics 63 included in the icon 64 showing the Buy Now price—see FIGS. 25a.

FIG. 25b shows one instance of the sales facilitator graphical interface 21 after a first bidder 14a (code 1402) has requested to participate in the sales process by providing the terms of engagement and a starting bid. As shown in FIG. 25b, a pop-up window 69 appears on the sales facilitator graphical interface 21 notifying the sales facilitator 16 that a bidder 14a has requested participation in the sales process by submitting a starting bid of 500,000 and the terms of engagement. Also, the table 68 is updated by the system 10 to include—in the tables last column corresponding to the row of each bidder 14—two icons: (1) a first icon which when activated it permits accepting the bidder 14 and another icon which when activated permits requesting the bidder 14a to re-submit, the terms of engagement and/or to replace the starting bid with another starting bid.

Further, as part of the above process for the terms of engagement described above, or in addition to, the bidder 14, 14a may have a pop-up window (not shown) or other graphical device which provides a list of purchase terms and conditions which were approved by the vendor 20 previous to or simultaneous with the Campaign Period 1. The bidder 14, 14a may select from the list of purchase terms and conditions by checking boxes, radio buttons or selecting from drop-down lists. As each purchase terms and condition has been allocated a term value, the bidder 14, 14a may now be associated with a ranking value, which may be the cumulative values of the term values selected by the bidder 14, 14a. The information relating to the selected purchase terms and conditions, and ranking value of the bidder 14 (and each bidder 14) is communicated to the server 12 and stored in the memory device. A bidder may not be approved to proceed with the sales process if the bidder fails to select terms. In some embodiments a bidder may also not be approved if their ranking, based on selected terms and weightings, is below an approval threshold. The approval threshold can be set by the vendor.

FIG. 25c shows the particular instance of the sales facilitator graphical interface 21 after, the sales facilitator 16 has activated the icon 70 that is labeled "Accept". As shown in FIG. 25c, a pop-up window 72 appears alerting the sales facilitator 16 that any bidders 14 may only be accepted after the bidder 14 having signed the corresponding written contracts and submitted their selection of the purchase terms and conditions.

FIGS. 25d to 25g shows particular instances of the sales facilitator graphical interface 21 during the campaign period 1 in which bidders 14 are requesting participation in the sales process and the sales facilitator is accepting new bidders 14 or requesting the new bidders to resubmit the new bidder's request. The new bidder 14 may be users 114 directed to the sales process via the Third Party Sales Platform 118 as described above.

In an arrangement, the sales facilitator 16 may remove a bid made by a particular bidder 14 if the sales facilitator considers that the bid is erroneous or has been made in bad faith. Removal of the bid may be conducted via the activable graphics 67 included in the icon 65 showing the current bid—see FIG. 25. In the event that a bid is removed, a pop-up window 74 appears alerting the sales facilitator 16 that it is illegal to remove a bid unless the bid is erroneous or has been made in bad faith—see FIG. 25g. Also, removal of a bid causes a notification to the bidders 14 that the current bid has been removed and that the current bid prior to the making of the removed bid is now again the current bid.

Referring now to FIG. 26, this figure shows a particular instance of the sales facilitator interface 21 during the final stage of the campaign period in which no bidders 14 are permitted to make a bid.

Further, as mentioned before after finalization of the campaign period 1, the bidding period 2 commences. FIGS. 27a to 27d show a particular instance of the sales facilitator interface 21 during the bidding period 2.

Figure 27A:
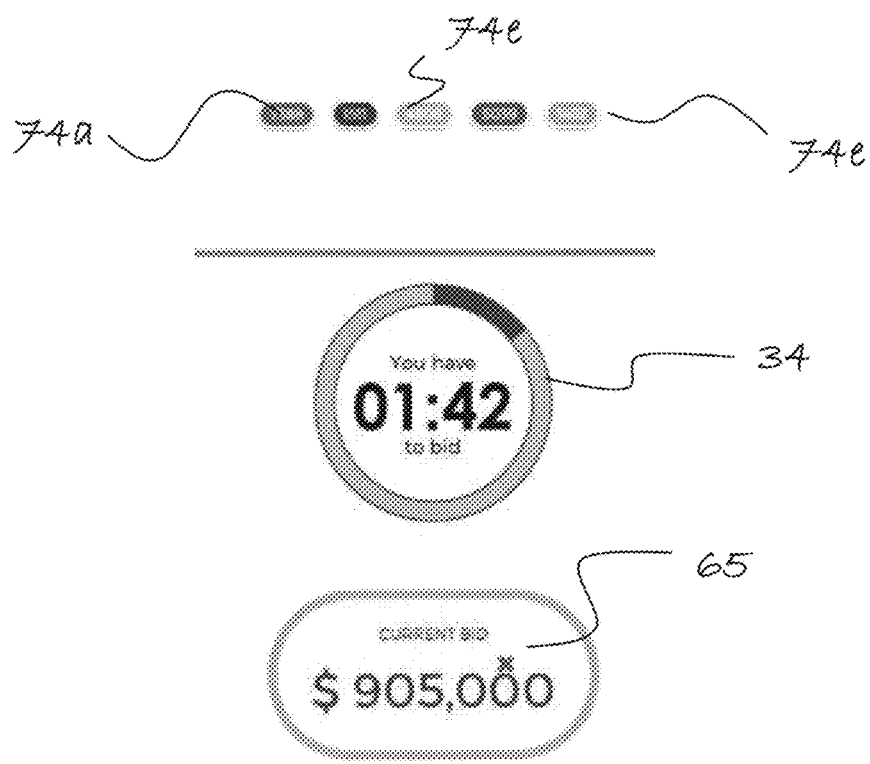
FIGS. 27a to 27d illustrates particular instances of the sales facilitator graphical interface during the bidding process.

In particular, FIG. 27a, shows the instance of the sales facilitator interface 21 of the first bidding stage 4 when there are 1:42 minutes left for the bidder to make a bid. This particular instance of the sales facilitator interface 21 shows a plurality of icons 74 (also referred to as paddles) representing each of the bidders 14 that are participating in the bidding period 2 and the icon 65 indicating the value of the current bid 65. Further, as mentioned before, at the moment when the last made bid is equal or greater than the reserve price, the second bidding stage 6 commences. At this stage, the bidders 14 have a period of time T5 to make one or more bids. Also, once the reserve price has been met, a pop-up window 76 appears in the sales facilitator graphical interface 21 alerting the sales facilitator 14 that the reserve price has been met.

Figure 27B:
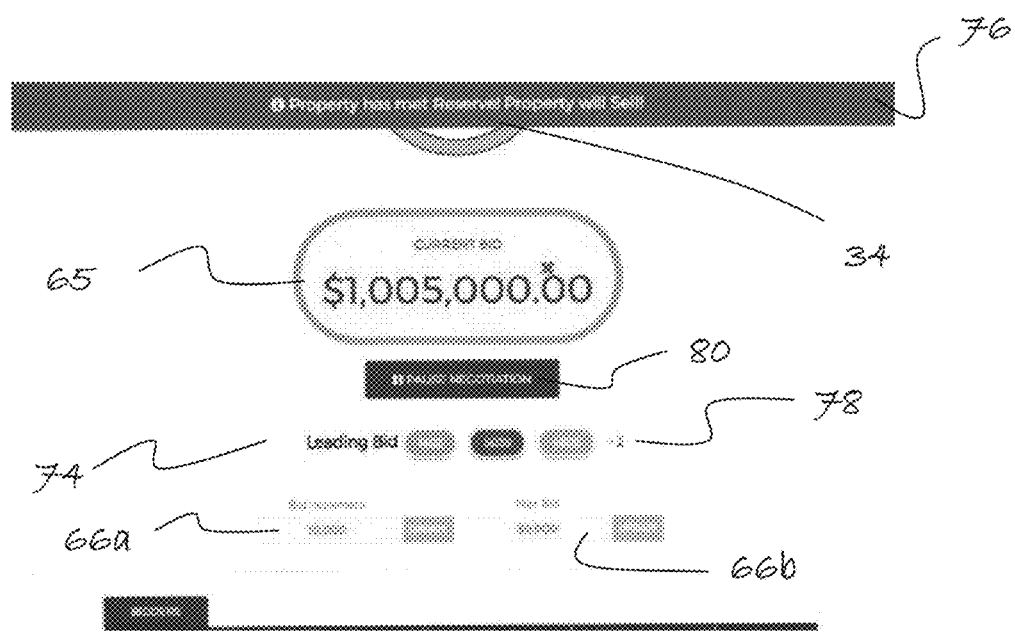
Figure 27C:
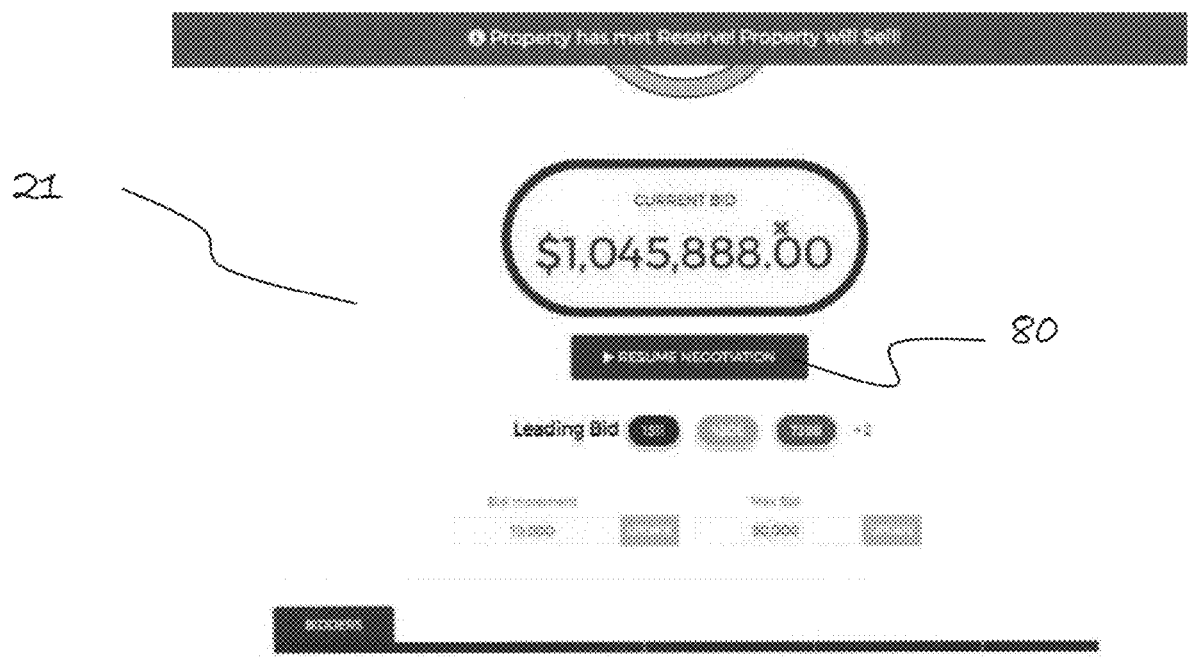
Figure 27D:
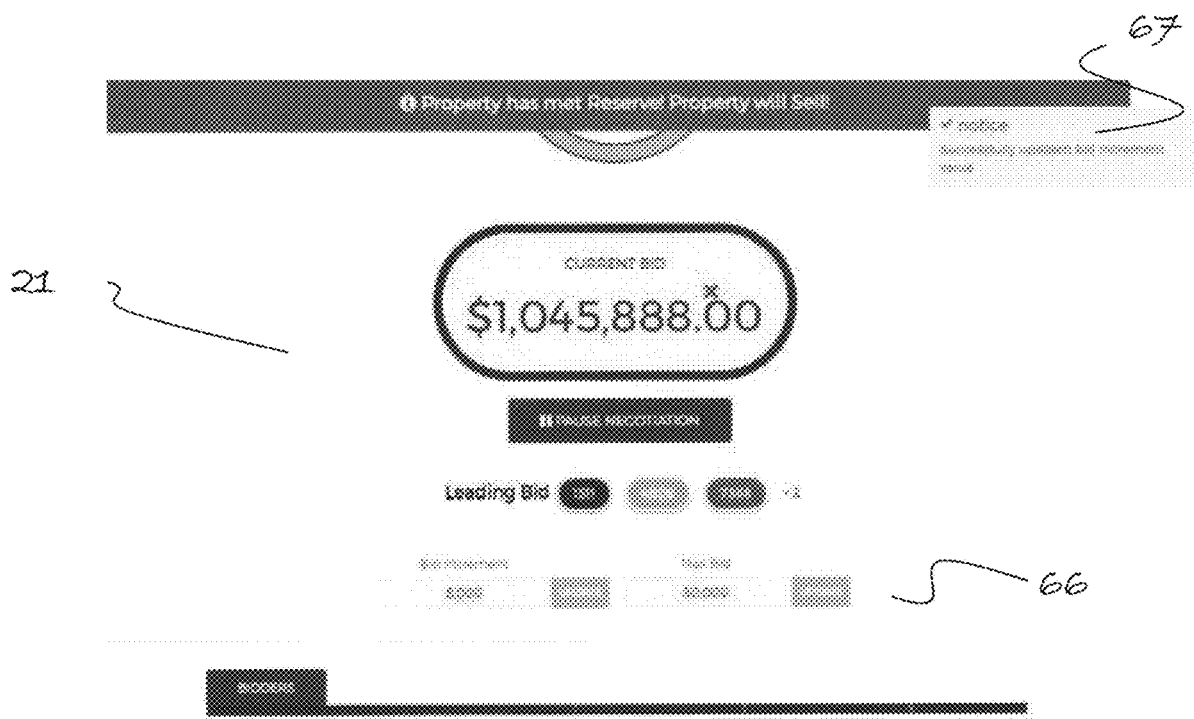

FIGS. 27b to 27d show particular instances of the sales facilitator graphical interface 21 during the second bidding stage 4. As shown in these figures, the instances of the sales facilitator graphical interface 21, comprises (1) the countdown icon 34 showing the time left for bidding, (2) the icon 65 indicating the current bid, (3) the icons 74 identifying the leading bidders 14 and an icon 78 indicating the number of bidders 14 not counting the leading bidders 14, and (4) icons 66a and 66b that show the values of the bid increment and the maximum bid possible. Additional icons (not shown) may also indicate the current bidder 14 ranking value, or the ranking value of the other bidders 14. Alternatively, the ranking value can be incorporated into the icons 65, 74 or 78.

As shown in the FIG. 27d, the icons 66 are icons that may be activated by pushing the area labeled as "Update" to either increase or decrease the bid increment and maximum bid. After updating a notification appear indicating that the update has been successful.

Further, the particular instances of the sales facilitator graphical interface 21 shown in FIG. 27 also comprises an icon 80 adapted to pause the bidding stage 6 and to resume the bidding stage 6. The sales facilitator 16 may pause the bidding stage 6 as shown in FIG. 27b and subsequently resume the bidding stage 6 as shown in FIG. 27b.

As mentioned before, the system 10 is also adapted to generate a bidder graphical interface 19 that permits interaction of the bidders 14 with the system 10 to participate in the sales process. FIGS. 5 to 15 illustrates particular instances of the bidder graphical interface during the sales process.

Referring now to FIGS. 5 to 15 showing the instances of the bidders graphical interface 19. These instances may be viewed by a particular bidder 14 on her/his remote device 22 (such as a computer or mobile) during the bidding process.

For the bidders 14 to participate in the sales mechanism, each bidder 14 is required to interact with the graphical interface 19 (for example, the touchscreen of their mobile phone or tablet) by touching particular sections.

For registering, the bidders 14 need to touch the area of the touchscreen (including an activable icon) that changes the current instance of interface to the instance of the bidder graphical interface 19 that permits the bidders 14 to provide the information required for registration at the sales mechanism graphical interfaces Also, at this stage each bidder 14 (separate from the other bidders 14) proceeds to agree with the vendor 20 (preferably through the sales facilitator 16) the terms of engagement, including selection of purchase terms and conditions as described above, for purchasing the property.

The bidders 14 may also include users 114 who have been re-directed to the sales mechanism from a Third Party Sales Platform 118, and the users 114 can then register as described in the previous paragraph to become a bidder 14.

Figure 5A:
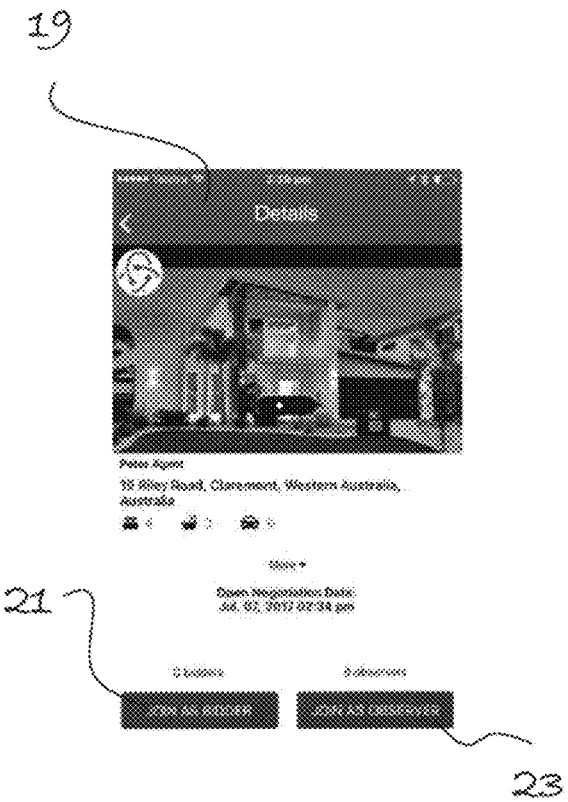
FIGS. 5a to 5c illustrate particular instances of a bidder graphical interface of a user to join as bidder and posting of a particular starting bid.
Figure 5B:
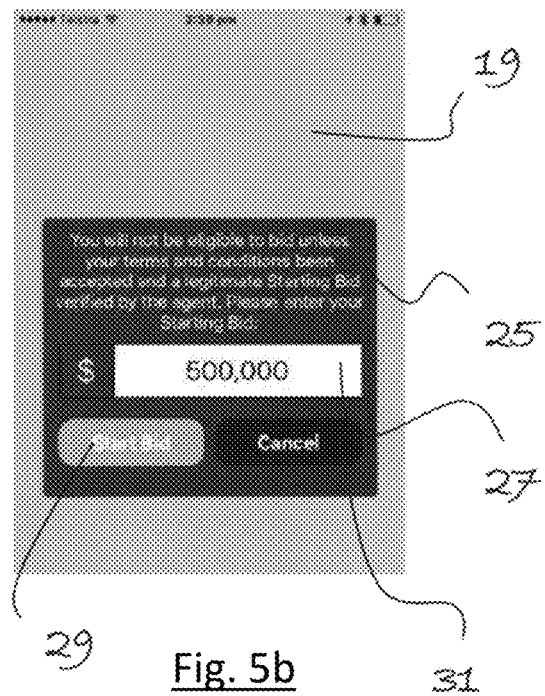
Figure 5C:
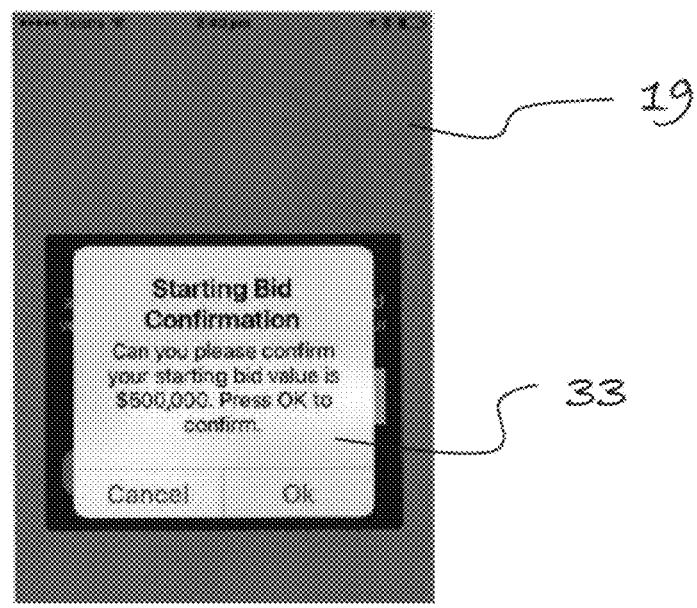

In particular, FIGS. 5a to 5c illustrates particular instances of the bidder graphical interface 19 of a user to join as bidder and posting of a particular starting bid. A particular arrangement of a first instance of the bidder graphical interface 19 prior commencement of the sales mechanism is shown in FIG. 5a. This particular instance shows an image of the property to be sold together with a description of the several characteristics of the property for the bidders 14 to review prior registration at the sales mechanism.

Figure 18:
FIG. 18 illustrates a particular instance of the sales facilitator graphical interface for login into the sales mechanism.

Further, this particular interface comprises an icon 21 that after being activated by the bidder 14 generates the interface of the bidders graphical interface 19 permitting login (via graphical interface shown in FIG. 18) in the system 10 to request participation in the sales process. The system 10 is adapted to generate the instances of the bidder's graphical interface 19 that permit the bidders 14 to register into the sales process by providing personal details and the terms of engagement including selection of purchase terms and condition. The instances of the bidder graphical interface 19 for registration of the bidders 14 are similar to the instances of the sales facilitator graphical interface 21 shown in FIGS. 19 and 20 with the difference that other type of information is requested such as personal details of the particular bidder 14 that is registering, digital files including the proposed terms of engagement, and selected purchase terms and conditions, for revision by the sale facilitator 16 in conjunction with vendor 20.

To achieve the selection, each bidder 14 may touch the area of the touchscreen which is activable, via icons representing radio buttons, check boxes or drop-down lists or the like, which represent different purchase terms and conditions so as to be able to select the purchase terms and conditions. The bidder 14 is then assigned a ranking value, which is a cumulative value of the term value of each of the selected purchase terms and conditions. A higher ranking value is associated with purchase terms and conditions which is more aligned to the preferred purchase terms and conditions of the vendor 20, and a lower ranking value is accordingly less aligned and is less desirable to the vendor 20.

Further, after registration, the bidder may make the starting bid through a particular instance of the bidder graphical interface 19 shown in FIG. 5b. After making the starting bid, a pop-up window 25 appears in the bidder graphical interface 19 (1) alerting the bidder 14 that only if the terms of engagement, including selection of purchase terms and conditions, have been accepted it is possible to make a legitimate starting bid and (2) providing a text box for inputting the starting bid. Two icons 29 and 31 when activated by the bidder 14 permit either submitting the starting bid or canceling submission of the starting bid.

Any submission of a starting bid as well as any subsequent bid to improve the earlier submitted bids need to be confirmed by the bidder 14 by activating the Ok icon of the pop-up window 33 shown in FIG. 5c.

After registration, each bidder 14 may proceed to the instances of the interface 19 of the app of the sales process displayed in the display of the remote devices 22 of each bidder 14. This is accomplished by touching the section of the cellphone's touchscreen that changes the registration instance of the interface to the instance of the interface prior commencement of the bidding process.

Figures 6, 7A:
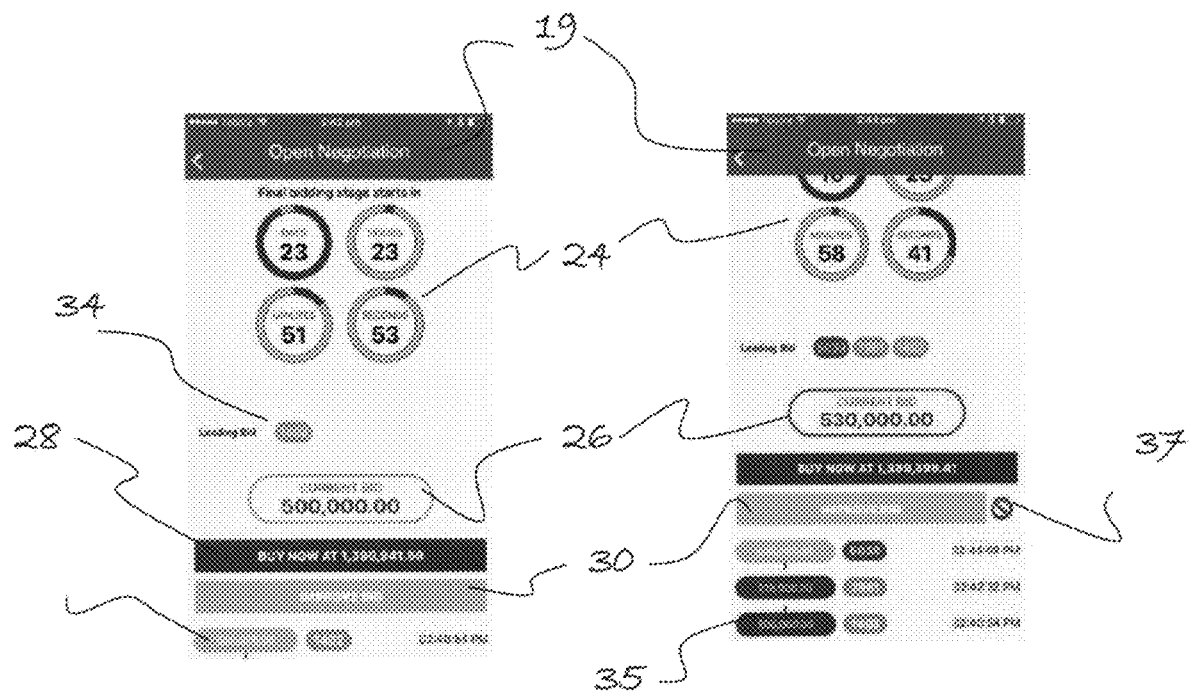
FIGS. 6 and 7a to 7f illustrate particular instances of a bidder graphical interface during the campaign period of the sales mechanism shown in FIG. 1.

FIG. 6 shows a particular instance of the bidder graphical interface 19 during the sales process that the system 10 generated in each of the bidders that have been accepted. This particular instance is generated after the first starting bid is submitted.

FIG. 6 shows one instance of the bidder graphical interface 24. This particular instance of the interface includes a (1) countdown timer 24 indicating to the bidders 14 the time left for the sales mechanism to commence, (2) an icon 26 indicating the amount of the current bid set by bidder 14 that made the last bid; (3) an icon 28 (the Buy-Now button) indicating the amount of money required for buying property without having to participate in bidding period 2, and (4) a button (icon) 30 labeled "Improve bid" for permitting any bidder 14 to make an overriding bid by pressing on the button 30.

As mentioned before, the sales facilitator 16 is able to set the particular amount (referred to as the bid increment) to be added to the current bid (shown in the icon 26).

The interface 19 also includes an area depicting the number of bidders 14 being shown as a listing 35 of the last bid of the bidder 14, code of the bidder 14, and time that the last bid has occurred.

Further, the system 10 is adapted to identify each bidder in conjunction with the particular bid that each bidder 14 has made—this allows anyone to identify which bidder 14 has made a current bid as shown in the icon 26.

The instances of the bidders graphical interface 19 comprises leading bid icons 34 that show at least the three leading bidders 14. Each bid 14 is assigned an icon 34 including an image of the bidder's code and coloured with a particular colour. As can be appreciated in FIG. 4, the first bidder 14 has been assigned the number 1402 and the colour green. In accordance with the present embodiment of the invention, the icon 26 showing the value of the current bid comprises a coloured border, the colour of the border coinciding with the colour that has been assigned to the bidder 14 that made the current bid as shown in the icon 26—in this manner, it is possible to identify which bidder 14 made the current bid. As discussed, the icon 34 may include information relating to the respective bidder's ranking value, or the ranking value can be presented elsewhere in the graphical interface 19.

Moreover, as mentioned before, the bidder graphical interface 19 may include a Buy-Now icon 30. This icon 30 includes an image of the price at which the property would be sold to any of the bidders 14 if activated without having to participate in the sales process. Activation of the icon 30 would stop the campaign period and the purchase period 3 would start only in relation to the bidder 14 that activated the button 30.

In accordance with the present embodiment of the invention, the number depicted in the button 30 is a number which value reduces as time progresses; thus, as the bidders 14 bid during the campaign period increasing the value of the current bid shown in icon 26, the Buy-Now value in icon 30 decreases. In this manner, the bidder's graphical interface 19 provides to the bidders concurrently a view of the increasing current bid value and the Buy-Now price. This facilitates the bidders to decide (by comparing both values) whether to keep participating in the campaign period 1 or to immediately purchase the property by activating the Buy-Now button 30.

Referring now to FIGS. 7 to 15. These figures depict the instances of the bidder's graphical interface 19 during the sales process.

In particular, FIGS. 7a to 7f depict the instances of the bidder's graphical interface 19 during the campaign period 1. The instances of the bidder's graphical interface 19 shown in FIGS. 7a to 7f are viewed by the bidders 14 and permit interaction of the bidders 14 with the system 10 during the campaign period 1 as has been described in the relation to FIG. 1 and FIGS. 19 to 27.

During the campaign period 1 any bidder may request withdrawal from the sales process; this may be done by activating an icon 37. After activation of the icon 37 a pop-up window will appear in the bidder graphical interface 19 of the particular bidder 14 that is requesting withdrawal; after confirmation by the particular bidder, the particular bidder 14 is then withdrawn from the sales process and not permitted to re-enter the sales process.

Further, each time a particular bidder 14 activates the improve bid icon 30, a first pop-up window will appear in the bidder graphical interface of the particular bidder 14 showing the amount that the particular bidder 14 will bid; after the bidder 14 accepting the bid, a second pop-up window will appear in the bidder graphical interface of the particular bidder 14 requesting confirmation from the particular bidder 14 and the bid will then be posted in the icon 26 as the new current bid.

Figures 7B, 7C:
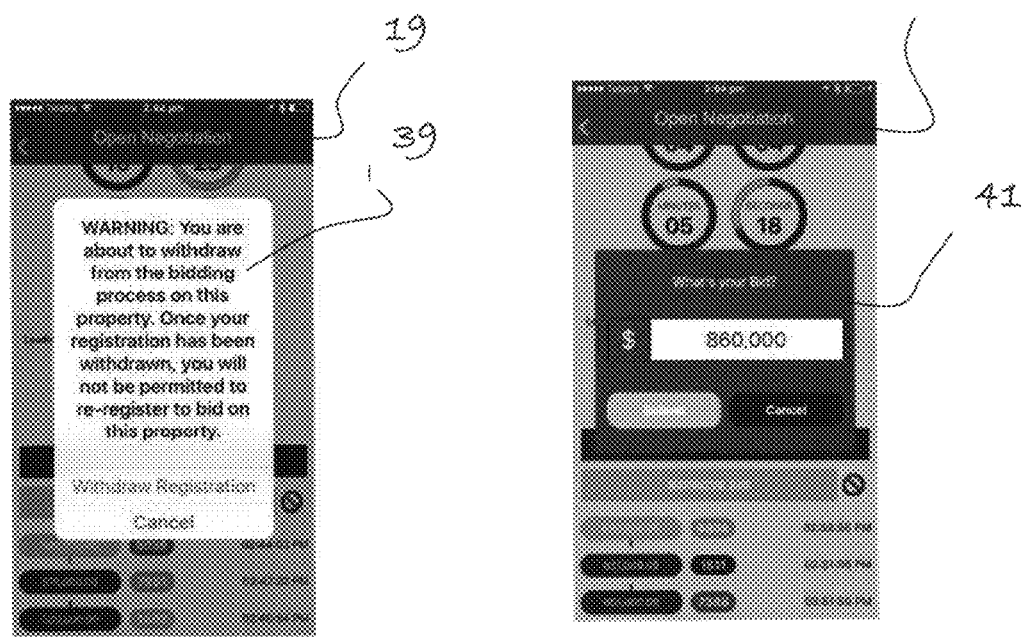
Figure 7D:
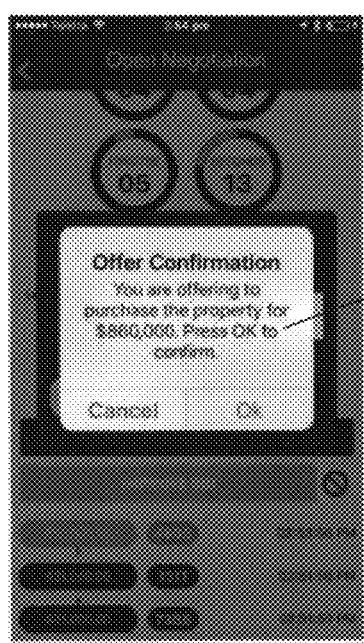
Figure 7E:
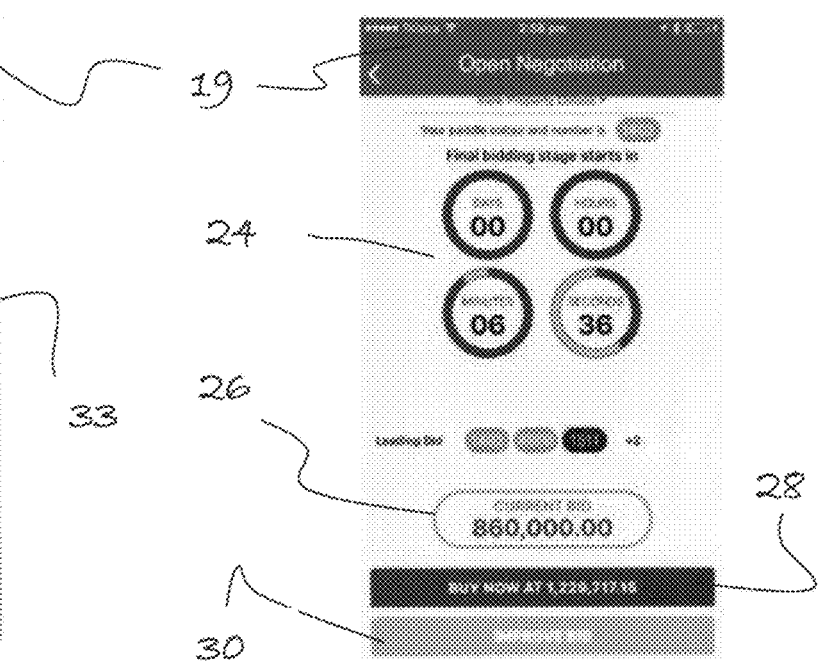
Figure 7F:
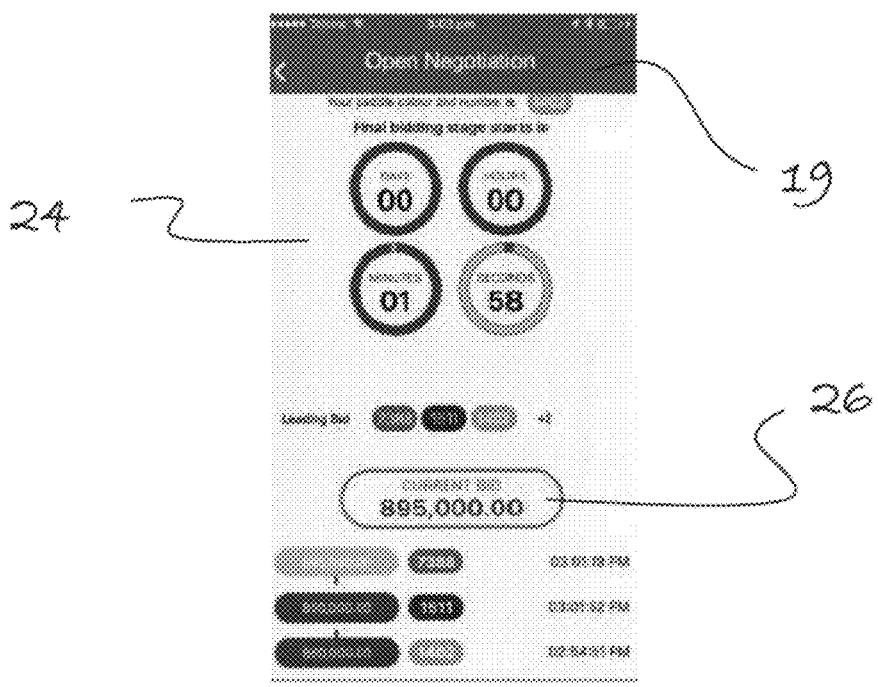
Figures 8, 9:
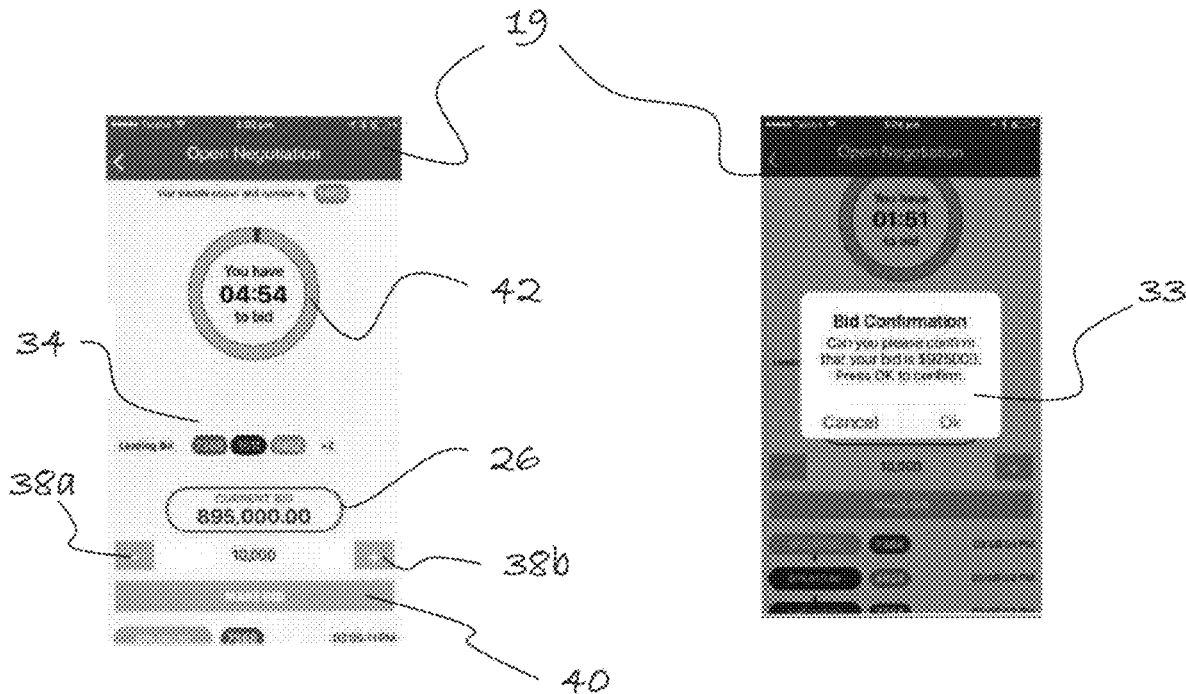
FIGS. 8 to 14 illustrate particular instances of the bidder graphical interface during the bidding period of the sales mechanism shown in FIG. 1.
Figures 10, 11:
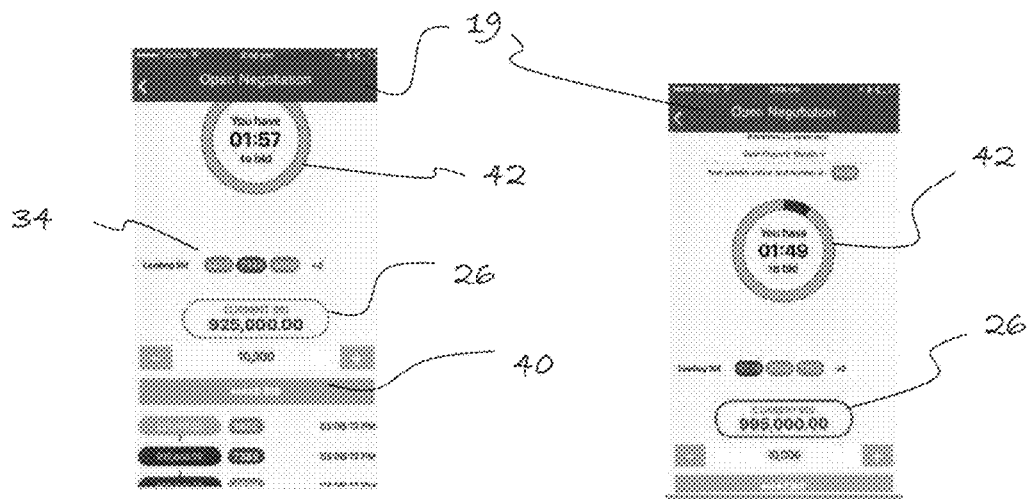
Figures 12A, 12B:
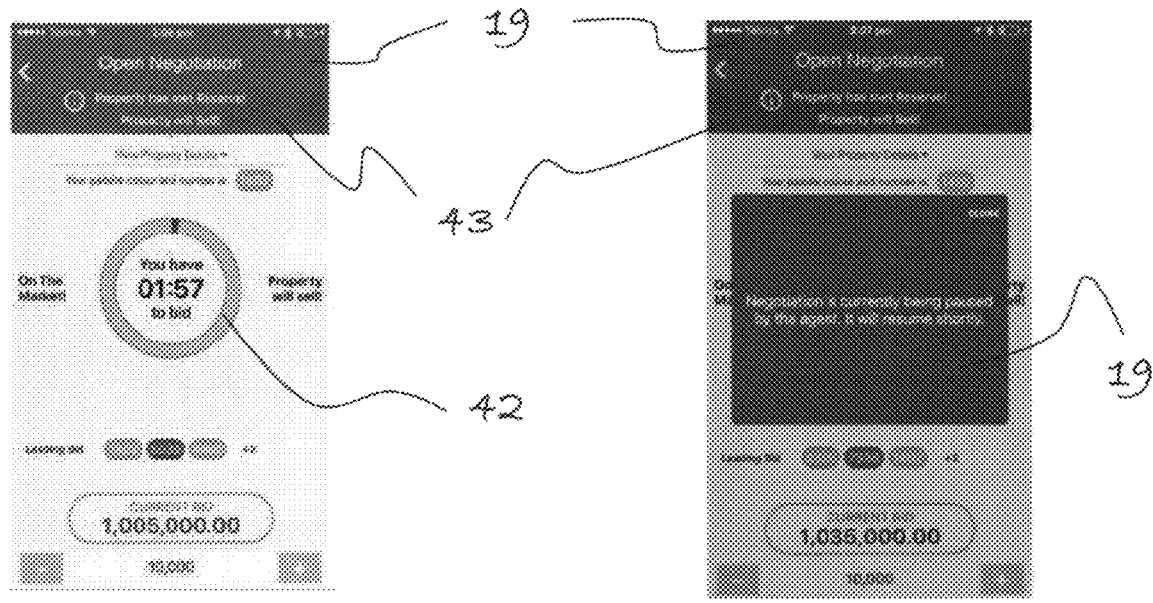

Furthermore, as mentioned before in connection to FIG. 1, during a second period time T2 prior lapsing of the campaign period 1, all of the bidders 14 are impeded from bidding and buying now the property by removal of the Buy-Now icon 28 and the Improve bid icon 30 as is shown in FIG. 7f.

FIGS. 8 to 11 depict the instances of the bidder's graphical interface 19 during the first bidding stage of the bidding period 2. As appreciated in FIGS. 8 to 11; the instances of the bidders graphical interface 19 during the first bidding stage of the bidding period 2 do not include anymore the Buy-Now button impeding the bidders to immediately buy the property by skipping the bidding period 2. Also, the bidders graphical interface 19 during the first bidding stage of the bidding period 2 include new icons 38a (for decreasing the bid increment) and 38b (for increasing the bid increment) permitting each bidder 14 to vary the bid increment; this permits each bidder 14 to personalise the increment of the current bid.

Figures 13, 14:
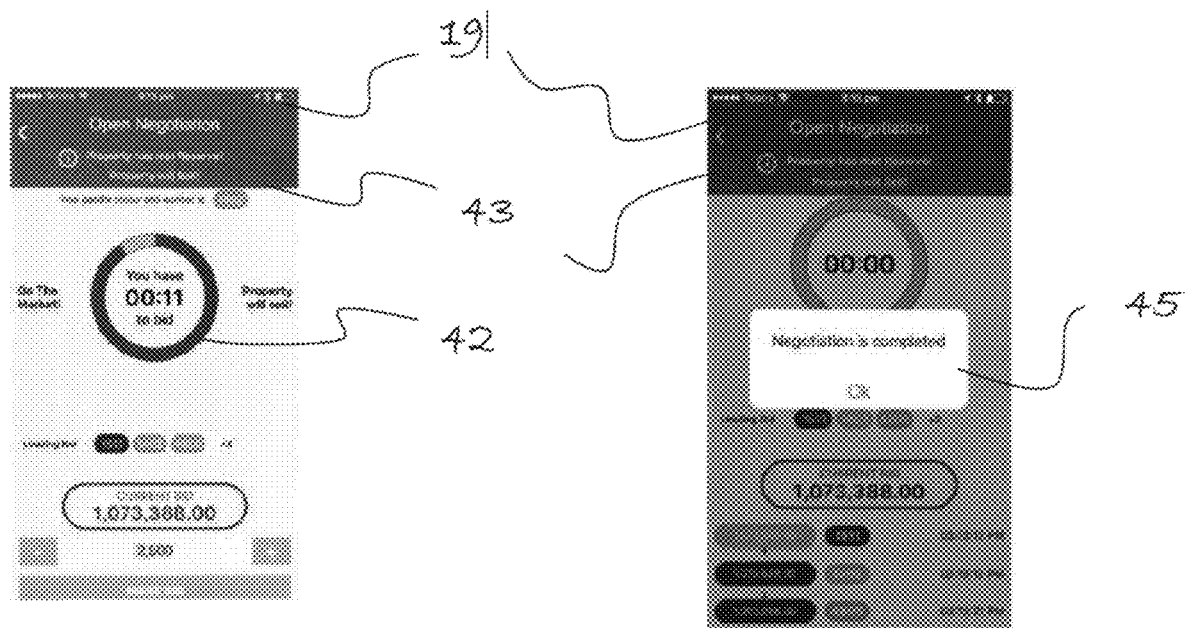

FIGS. 12 to 14 depict the instances of the bidder's graphical interface 19 during the second bidding stage of the bidding period 2. As shown in FIGS. 12 to 14, the instances of the bidder's graphical interface 19 during the second bidding stage of the bidding period 2 include a notification to the bidders 14 that the reserve price has been met. The notification (the notification may in the form of a pop-up window 76, such as a red banner 43) includes information regarding the fact that the reserve price has been met and the item is on the market and will sell. Also, the count-down timer 42 is reset to a fixed fifth period of time T5 (such as two minutes) after completion of the fifth period of time T5 the bidder 14 that made the last highest bid will purchase the property.

In a preferred embodiment, at least two of the bidders 14 who made the highest bids will be selected as the 'top bidders'. Alternatively, the sales facilitator 16 can increase the number of highest bidders selected to three or more bidders 14. The ranking value for each of the at least two bidders 14 can be displayed on the sales facilitator computing device 22 along with the highest bids for selection of the winning bid, in communication with the vendor 20. Alternatively, the sales facilitator 16, assign the winning bid based on a pre-selected arrangement, for example, if the ranking value is equal to or higher than 5 the highest bid purchases the property, or in another example, if the difference between the highest bids of the top bidders is less than $5k, then the winning bidder 14 is selected based on the highest ranking value. In this way, the vendor 20 advantageously can achieve their preferred or best purchase terms by compelling bidders 14 to select pre-selected approved purchase terms and conditions.

At this stage, the instances shown in FIG. 15 will be displayed in the screen of the remote devices 22 of the bidders 15.

Figure 28:
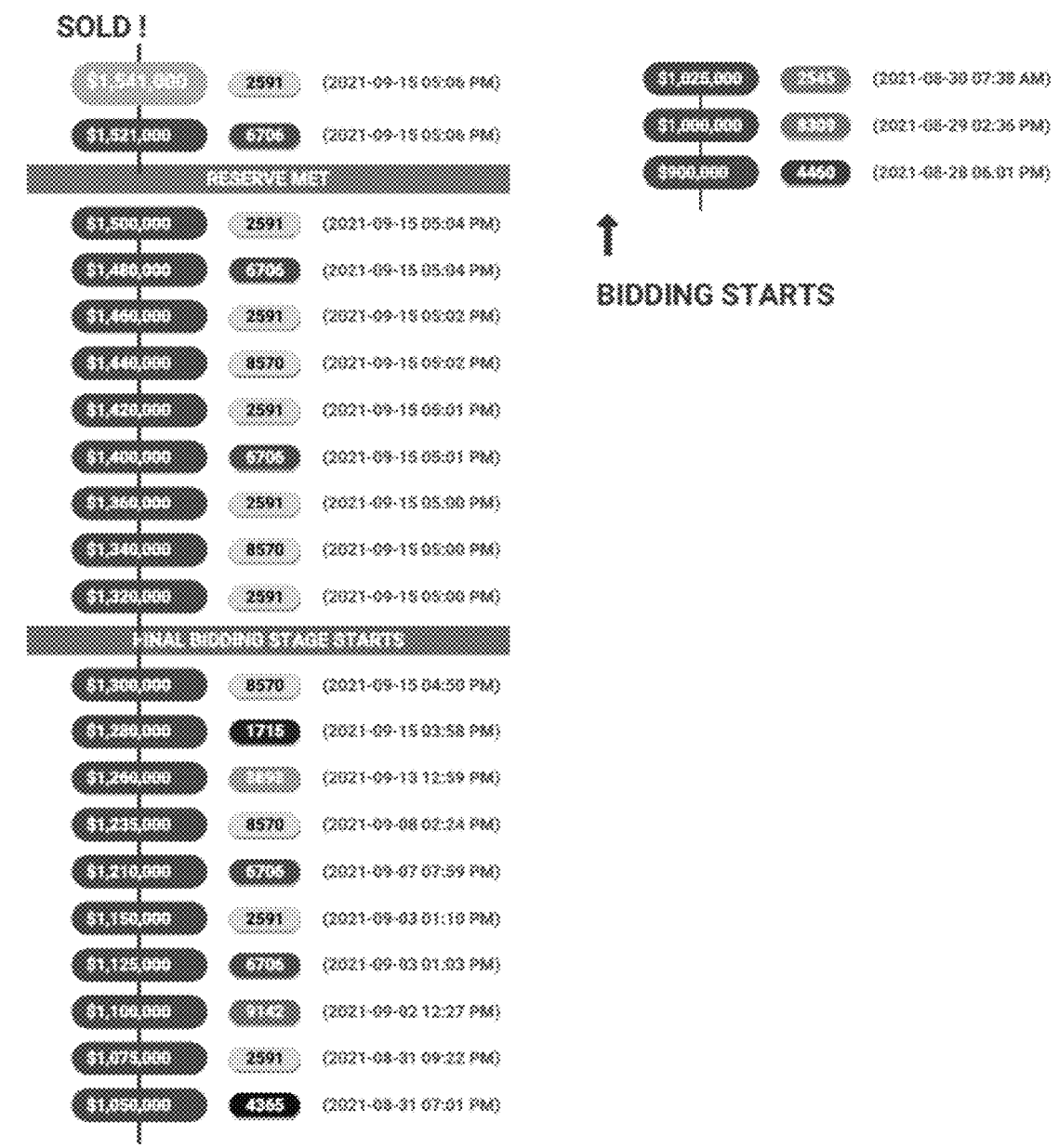
FIG. 28 is another particular bidding timeline of the sales mechanism.

The interface 19 may provide a timeline of the bidding process that just has finalised. FIGS. 16 and 28 shows this timeline illustrating (1) each of the bids and when the bids were submitted and by which of the bidders and (2) the duration of the bidding process, number of bids and the amount of money at which the property was sold. In addition, the timeline may also provide the bidders ranking value (not shown), in the bidder interface 19. In addition, the timeline can also indicate when bidding commences, when the final bidding stage starts and when the reserve is met. The sales facilitator 16 may also be able to select whether the amount of each bid is shown in the timeline, or whether the amount is concealed, at any time during the process. The information in this timeline is stored in the memory device by the server 12 for use.

In addition, the at least one processor, may also monitor when (i.e. at which time period) a bidder 14 commences bidding, and the amount of their bids, and the number of bidders 14 which participate in the sales process and those that do not, and their associated ranking values, and store this information in the memory device. Further, the at least one processor, may monitor when bidders 14 choose to withdraw or cease bidding, at which time period, and the amount of their last bid, and also store this information in the memory device. The increments of the bids of each bidder 14 through the timeline is also stored, by the processor, in the memory device. Information relating to users 114 who are directed from Third Party Sales Platforms 118, and which Platforms 118, if there are multiple Third Party Sales Platforms 118 are also stored, by the processor, in the memory device.

As each sales process is conducted, the information is accumulated from each process and, the at least one processor can present a representation of the stored information of a single sales process or multiple sales processes to a sales facilitator or other user interface. The at least one processor can also sort or otherwise filter the information based on types and numbers of bidders (whether losing or winning bidders), starting and final bids, amount of bid increments, clearance rate, and the associated time periods of the sales process in which these occur, as well as geographic location of the item of real estate, the number of days the item has been on the market, and date. The representations can be in the form of graphical representations such as charts, graphs, maps, diagrams, tabular representations, or text/numerical representations examples of which are shown in FIGS. 29 to 32.

Figure 29:
FIG. 29 is an example of stored information presented in a tabular format for a particular sales process.

FIG. 29 is an example of information presented in a tabular format for a particular sales process after the property has sold showing the sale price, number of bidders 14, days on market, final bidding stage date and duration and number of observers. This type of valuation support gives an understanding of the level of market support for properties sold in that area where previously only the median price is known. The information from each property can be cumulated for a number of sales process to assist buyers, vendors, property developers, mortgage providers or insurers in an improvement of understanding buyer support and competition for property types. This provides bidders and other users with real time feedback through their device on how much competition exists and where their price stands, resulting in an optimal sales outcome. Examples of the cumulated information of multiple properties are shown in FIGS. 30 to 33.

Figure 30:
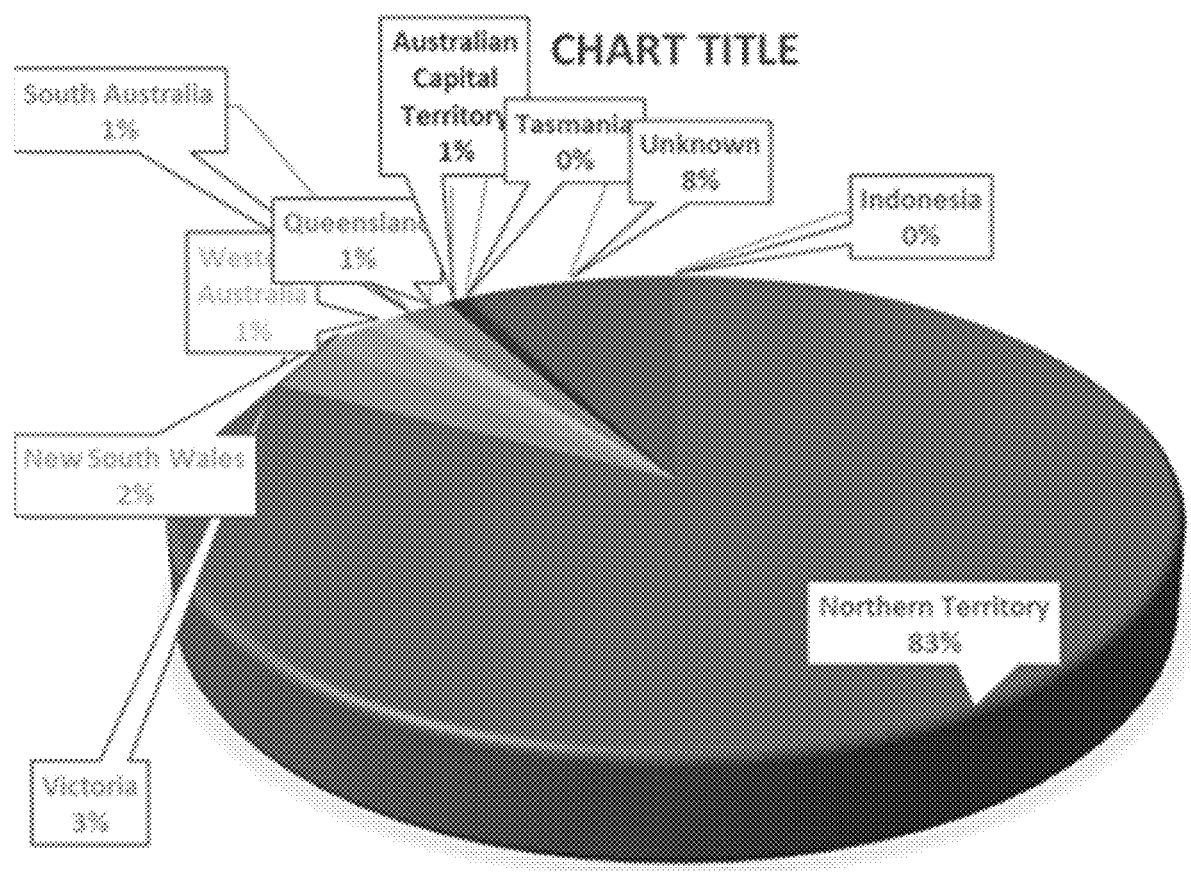
FIG. 30 is a pie chart showing buyer demand by location, as sorted by Australian state and territory.

FIG. 30 is a pie chart showing buyer demand by location, as sorted by Australian state and territory.

Figure 31:
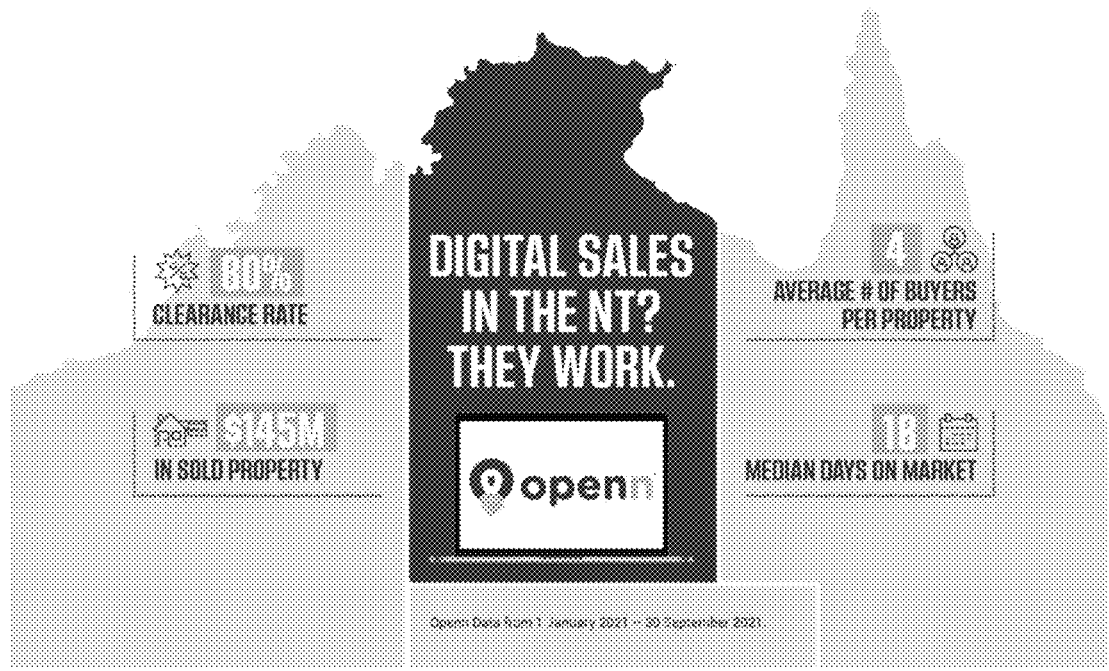
FIG. 31 is an example of a graphic representation of cumulated values from multiple sales processes for a particular geographic region.

FIG. 31 is an example of a graphic representation of cumulated values from multiple sales processes for a particular geographic region, i.e. the Northern Territory. The representation indicates the clearance rates, median days on market, average no. of buyers per item of real estate and the accumulated value of the sold items.

Figure 32:
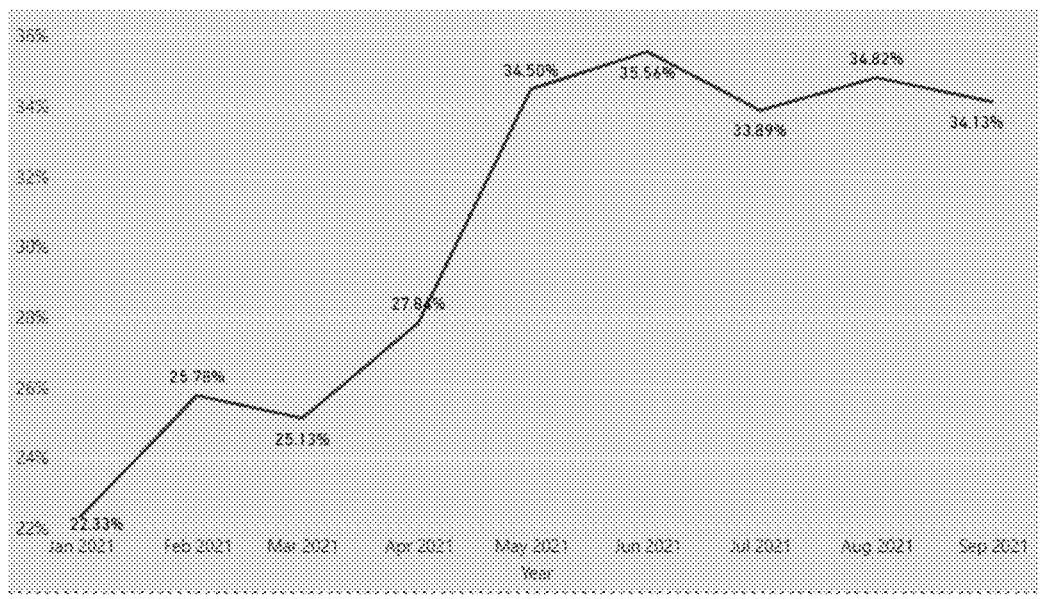
FIG. 32 is a graph of cumulated market share for multiple sales process for a geographic region of Greater Darwin.

FIG. 32 is a graph of cumulated market share for multiple sales process for a geographic region of Greater Darwin over each month for several months.

Figure 33:
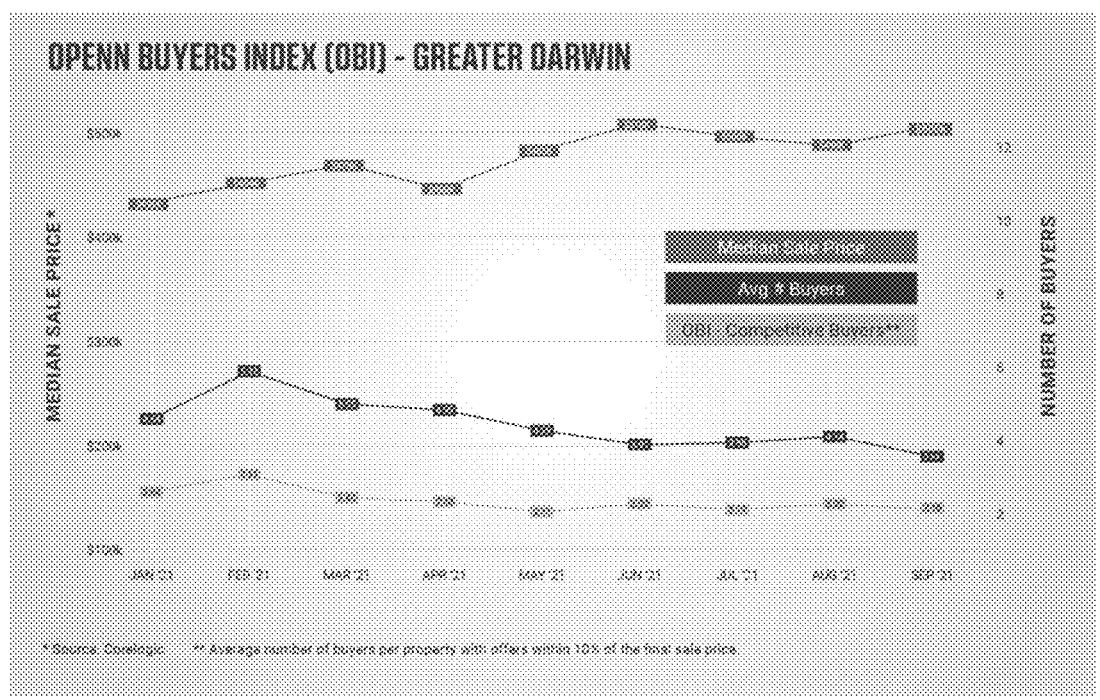
FIG. 33 is an example graph of a buyers index for Greater Darwin.

FIG. 33 is an example graph of the buyers index for Greater Darwin showing the median sale price, number of competitive buyers, and average number of buyers. This effectively tracks the level of buyer support across the sales platform, in real time.

When combined with existing industry data, the buyers index, and cumulated information as discussed in previous paragraphs stored in the memory device, can provide valuable insights to the market, enabling buyers, sellers and the finance sector to make more informed decisions. Understanding the level of market support for properties sold in an area adds a potentially profound new dimension to valuation modelling, where previously the median price only was known.

The stored information when presented in a number of the example representations can enhance vendor/bidder and industry decision making in property investments through depth of stored information. For example, by tracking trends beyond the number of sales, or sales prices, but the intensity of competition over time.

The applicant envisages that the property developers and local councils benefit from understanding how many buyers there are by price point in a given area, for a given property type to assist in planning neighborhoods and accompanying facilities. For example, if building an apartment complex, how many apartments should be allocated to different quality segments (for instance: $1.3m vs $1.1m vs $900K).

The applicant also envisages that the stored information and representations can also assist bidders 14 to come to decisions in respect of justifying spending another $20K to win. If a bidder 14 can see the level of buyer support or competition across similar property types, then the bidders 14 can make a more informed decision with more confidence than with currently available information.

In respect of vendors 20, the applicant also envisages that the stored information and representations can also assist vendors to make informed decisions relating to selling an item at a price less than its assumed worth, or whether renting is a better financial decision. By understanding buyer support (in real time on the item) and by analysing trends across other properties) the vendor 20 can make an informed decision with much greater confidence.

As a mortgage provider, or mortgage insurer, the stored information and representations can assist assessment of the level of pricing risk in a given area and is profoundly improved by understanding the depth and intensity of buyer support (competition) for a given property type by use of the stored information and its representations.

This information is of great value for, for example, valuation of property of the country and around the world. Previously, only the median price of sold properties was known and did not provide any of the insights or buyer support or vendor support as proposed by the applicant.

From the above descriptions it is evident that the sale mechanism in accordance with the present embodiment of the invention provides a sales methodology that is particularly advantageous when compared to conventional sales mechanisms such as for example private treaty, sales mechanism and tender/end sale. FIG. 17 shows a comparison between the sale mechanism in accordance with the present embodiment of the invention and several conventional sales mechanisms. As can be seen from FIG. 17, the sale mechanism in accordance with the present embodiment of the invention has all of the advantages of an ideal sales mechanism in contrast with the above mentioned conventional sale mechanisms.

Further, the bidding process is transparent. For example, the bidding process provides to each of the bidders 14 all of the submitted overriding bids as these overriding bids occur. Provision of each overriding bid is provided to each bidder at substantially the same time as the overriding bid is submitted; in this manner, all bidders 14 at the same time are aware that an overriding bid has been submitted allowing the bidders 14 to know the amount of the overriding bid that just has been submitted.

Furthermore, the bidding process provides every bidder 14, at any time during the duration of the bidding process, an opportunity to submit as many overriding bids as they wish. However, in an arrangement, a same bidder 14 may not submit two consecutive overriding bids.

Moreover, in a particular arrangement the sales facilitator 16 may withdraw or reject any inappropriate bid. The sales facilitator may withdraw or reject the inappropriate bid by interacting with a graphical interface visible only to the sales facilitator.

Modifications and variations as would be apparent to a skilled addressee are deemed to be within the scope of the present invention.

Further, it should be appreciated that the scope of the invention is not limited to the scope of the embodiments disclosed. For example, the sales mechanism in accordance with the present embodiment of the invention have been described in such a manner that the sales facilitator is the responsible party for organising the bidding process and the sales mechanism; however, in accordance with other embodiments other parties may be responsible for organising the bidding process and the sales mechanism.

Throughout this specification, unless the context requires otherwise, the word "comprise" or variations such as "comprises" or "comprising", will be understood to imply the inclusion of a stated integer or group of integers but not the exclusion of any other integer or group of integers.

Furthermore, various different terminologies are used in this specification which relate to graphical user interface elements, such as icons, buttons, text-boxes, regions, areas, media, and windows. It should be understood that these and other terminology refer to Activable Graphics that are displayable on a display screen and that can be activated by the users of the sales mechanism via touch screen, mouse devices and/or keyboards for providing information, executing a particular action and issuing a particular request. The system 10 is adapted to make these graphics activable to permit interaction with the participants and data base servers through the software and hardware of the system.

Further, the terms servers, computers, PCs, tablets, or similar computing devices as well as communication devices such as cellphones are all considered to at least have processors for executing software stored in memory, communications components (e.g., Ethernet or Wi-Fi) for communicating with other devices across a data network, as well as input devices, such as touch screens, mouse devices, or keyboards, to interact with the software. The software may at least include an operating system, a web browser and sales mechanism software.

The invention claimed is:

1. A method for conducting a sales process facilitated by a sales facilitator and in which a plurality of bidders submit bids for purchasing an item of real estate implemented via a computer system comprising a server computer having at least one processor connected, via a computer network, to a sales facilitator computing device and bidder computing devices and the processor configured to represent, to the computing devices, a website which conducts the sales process, and which displays a number of icons which are activable by the bidders via the bidder computing devices, the method comprising the steps of:
   storing, by the sales facilitator, information relating to the item and to parameters for controlling the sales process including a cost of buying the item now, a reserve price, and a number of time periods;
   starting a first countdown timer, by the processor, to measure a first particular period of time;
   storing, by each of the bidders, information relating to the respective bidder and to terms of engagement proposed by the bidder and approved by the sales facilitator to enable the bidders to participate in the sales process wherein the terms of engagement include purchase terms relating to the item of real estate and determining a ranking value for each bidder based on a comparison of the purchase terms proposed by the bidder with pre-selected purchase terms approved by the sales facilitator;
   displaying to each of the bidders, via the bidder devices, a first icon which is activable to allow each of the bidders to input a starting bid for purchasing the item;
   displaying, once the first icon has been activated by any of the bidders, to each of the bidders, via the bidder devices, a second icon which is activable to allow one of the bidders to submit an improved bid which has the value of a bid increment added to the starting or the previously improved bid;
   while the first particular period of time is less than a first period of time, iteratively repeating steps a) and b):
      a) when the first particular period of time is less than a difference between the first and a second time period, then permitting any bidder to activate the second icon thereby allowing the bidder to improve their bid;
      b) when the first particular period of time is less than a difference between the first and second time periods, impeding the bidders from activating the first icon;
   starting a second countdown timer, by the processor, to measure a second particular period of time and iteratively performing the following step of:
      displaying to each of the bidders via the bidder devices, a third icon which is activable to allow a particular bidder to improve their bid;
   while the second particular period of time is less than a third period of time and the improved bid is less than the reserve price, permitting any bidder to activate the third icon to improve their bid;
      resetting the second countdown timer to zero when any improved bid is greater than or equal to the reserve price and starting a third countdown timer, by the processor, to measure a third particular period of time, and, while the third particular period of time is less than a fourth period of time iteratively performing the step of:
         permitting any bidder to activate the third icon to improve its previous bid;
      determining which at least two bidders have the highest improved bids when compared to the other bidders;
      determining which of the at least two bidders have a higher ranking value; and
      selling the item to one of at least two bidders on the basis of the bidder's highest improved bids and ranking value.

2. The method according to claim 1, wherein the purchase terms relating to the item of real estate comprise comprises a period of settlement of the item of real estate.

3. The method according to claim 1, wherein the purchase terms relating to the item of real estate comprise terms associated with finance.

4. The method according to claim 1, wherein the purchase terms relating to the item of real estate comprise vacant possession of the item.

5. The method according to claim 1, wherein the purchase terms relating to the item of real estate comprise inclusion or exclusion of chattel in respect of the item of real estate.

6. The method according to claim 1, further comprising the step of displaying to users on another website, a fourth activable icon which is representative of the item of real estate and is associated with an address of the website, and when the fourth icon is activated by a user of the another website, permits the user of the another website to be directed to the address of the website for participating in the sales process.

7. The method according to claim 6, wherein, when the user is directed to the website, displaying to the user a fifth icon displaying the cost of buying the item now and permitting the user to activate the fifth icon to purchase the item directly.

8. The method according to claim 1, wherein the step of determining a ranking value comprises the step of displaying purchase terms pre-selected by the sales facilitator to at least one of the bidders, allowing bidders to activate icons which are configured to allow bidders to select at least one of the purchase terms, wherein each one of the purchase terms is assigned a value and the ranking value of each bidder is based on the cumulative values of the purchase term values selected by each bidder.

9. The method according to claim 1, further comprising the step of displaying in bidder graphical interfaces of the bidder computing devices and the sales facilitator graphical interface of the sales facilitator computing device, a graphical representation of the sales process comprising icons representing each bidder or each bidder's bids.

10. The method according to claim 9, wherein the step of displaying in bidder graphical interfaces of the bidder computing devices and the sales facilitator graphical interface of the sales facilitator computing device, the graphical representation of the sales process further comprises permitting the sales facilitator to selectively show or conceal the amount of each bid on the icons representing each bidder or each bidder's bids.

11. The method according to claim 1, further comprising the step of, during execution of the sales process, storing data in the at least one memory device, the data including (1) each of the bids and when the bids were submitted and by which of the bidders and (2) the duration of the bidding process, number of bids, bid increments and the amount of money at which the property was sold.

12. The method according to claim 11, wherein the data further includes a last bid of any non-purchasing bidders.

13. The method according to claim 12, wherein the data includes the time period when the last bid was made by non-purchasing bidders.

14. The method according to claim 13, further comprising the step of permitting any of the bidders to withdraw from the sales process and storing data regarding bidder withdrawal in the memory device.

15. The method according to claim 14, further comprising the step of collecting the data from a plurality of sales processes and arranging the data as a representation for purposes of assisting another sales process.

16. The method according to claim 15, wherein the representation is at least one of: a graphical representation, a tabular representation, a text representation, and a numerical representation.

17. The method according to claim 1 further including the step of:
  displaying to each of the bidders via the bidder devices, a fifth icon displaying a cost of buying the item now which is activable to allow any of the bidders to purchase the item directly; and
  while the first particular period of time is less than a first period of time, iteratively repeating steps a) and b) unless the fifth icon has been activated by a particular bidder:
  a) when the first particular period of time is less than a difference between the first and the second time period, then permitting any bidder to activate the second icon thereby allowing the bidder to improve their bid;
  b) when the first particular period of time is less than a difference between the first and second time periods, impeding the bidders from activating the first icon and the fifth icon.

18. A computer system for conducting a sales process, the computer system comprising:
  a server computer comprising:
    at least one processor executing executable code; and
    at least one memory device communicating with the at least one processor accessible via a computer network and storing the executable code, wherein the executable code, when executed by the at least one processor, causes the at least one processor to:
      generate and transmit, via the computer network, a signal to a plurality of bidder computing devices and a sales facilitator computing device, the signal being representative of a web site for offering for sale and selling an item of real estate, the web site comprising a plurality of instances of graphical interfaces comprising activable graphics capable to be activated via the sales facilitator computing device and comprising a plurality of instances of graphical interfaces comprising activable graphics capable to be activated via the bidder computing devices;
      receive, via the computer network, signals from the sales facilitator computing device generated via the sales facilitator graphical interface, the signals relating to:
        information relating to the item; and
        parameters for controlling the sales process including a cost of buying the item now, a reserve price, and a number of time periods;
      store, responsive to the signals, the information relating to the item and parameter values in the memory device;
      start a countdown timer, executing in the at least one processor, for measuring a first period of time, the at least one processor transmitting via the computer network a signal to each bidder computing devices to display the time remaining for visualization by the bidders;
      receive, via the computer network, signals from the bidder computing devices via the bidder graphical interfaces, the signals relating to information relating to the respective bidder including terms of engagement proposed by the bidder and approved by the sales facilitator to enable the bidders to participate in the sales process, wherein the terms of engagement include purchase terms relating to the item of real estate;
      store, responsive to the signals, the information and parameter values relating to the signals from the bidder computing devices in the memory device;
      determine a ranking value for each bidder based on a comparison of the purchase terms proposed by the bidder with preferred purchase terms approved by the sales facilitator and storing said ranking values in the memory device;
      receive by the server, via the computer network, signals from one or more of the bidder computing devices generated in response to bidder activation of a first icon which is activable to allow each of the bidders to input a starting bid for purchasing the item;
      generate and transmit, via the computer network a signal to the plurality of bidder computing devices, the signal causing the bidder computing devices to display, once the first icon has been activated by any of the bidders, to each of the bidders via the bidder devices, a second icon which is activable to allow one of the bidders to submit an improved bid which has the value of a bid increment added to the starting or the previously improved bid, the at least one processor storing the improved bid in the memory device;
      while the first particular period of time is less than a first period of time, iteratively repeating steps a) and b):
        a) when the first particular period of time is less than a difference between the first and a second time period, then the at least one processor receiving signals from bidder computing devices relating to activation of the second icon thereby allowing the bidder to continuously improve their bid;

b) when the first particular period of time is less than a difference between the first and second time periods, impeding the bidders from activating the first icon;

start a second countdown timer, executing in the processor, to measure a second particular period of time and iteratively performing the following step of:

displaying to each of the bidders via the bidder devices, a third icon which is activable to allow a particular bidder to improve their bid;

while the second particular period of time is less than a third period of time and the improved bid is less than the reserve price, permitting any bidder to activate the third icon to improve their bid;

reset the second countdown timer, executing in the at least one processor, to zero when any improved bid is greater than or equal to the reserve price and starting a third countdown timer, by the processor, to measure a third particular period of time, the at least one processor sending a signal to the bidder computing devices to display the remaining time measured by the third countdown timer, and, while the third particular period of time is less than a fourth period of time iteratively performing the step of:

permitting any bidder to activate the third icon to improve its previous bid;

determine which at least two bidders have the highest improved bids when compared to the other bidders;

determine which of the at least two bidders have a higher ranking value; and sell the item to one of at least two bidders on the basis of at least one of: the bidder's highest improved bids and ranking value.

19. The computer system according to claim 18, wherein the executable code, when executed by the at least one processor, causes the at least one processor to generate and transmit, via the network, signals to display in the bidder graphical interfaces and the sales facilitator graphical interface a graphical representation of the sales process comprising icons representing each bidder or each bidder's bids.

20. The computer system according to claim 19, wherein the step of generating and transmitting, via the network, signals to display in the bidder graphical interfaces and the sales facilitator graphical interface a graphical representation of the sales process comprising icons further comprises permitting the sales facilitator to input a signal, via the sales facilitator computing device, and the at least one processor, in response to the signal, selectively showing or concealing the amount of each bid of the sales process.

21. The computer system according to claim 18, wherein the system is configured to communicate, via the computer network, to a further server computer comprising: at least one further processor executing executable code; and at least one further memory device communicating with the at least one further processor and storing the executable code, wherein the executable code, when executed by the at least one further processor, causes the at least one further processor to:

generate and transmit, via the computer network, a signal to the sales facilitator computing device, the signal being representative of a further web site for offering for sale and selling items, one of which is the item of real estate, the further web site comprising a plurality of instances of graphical interfaces comprising activable graphics capable to be activated via the sales facilitator computing device and comprising a plurality of instances of graphical interfaces comprising activable graphics capable to be activated via user computing devices; and display to users on the further website, a fourth activable icon which is representative of the item of real estate and is associated with an address of the website, and when the fourth icon is activated by the user, permits the user of the further website to be directed to the address of the website for participating in the sales process.

22. The computer system according to claim 21, wherein, when the user is directed to the website from the further website, displaying to the user a fifth activable icon displaying the cost of buying the item now and permitting the user to activate the fifth icon to purchase the item directly.

23. A non-transitory computer readable storage medium storing one or more programs, the one or more programs comprising instructions that, when rendered on a remote computing device, cause the remote computing device to display a web site comprising a plurality of graphical interfaces capable to be activated by a sales facilitator or a plurality of graphical interfaces capable to be activated by a particular bidder when the remote computing device is connected over the internet to a server computer comprising at least one processor executing executable code and at least one memory device communicating with the processor accessible via a computer network and storing the executable code, wherein the executable code, when executed by the at least one processor, causes the at least one processor to:

generate and transmit, via the computer network, a signal to a plurality of bidder computing devices and a sales facilitator computing device, the signal being representative of a web site for offering for sale and selling an item of real estate, the web site comprising a plurality of instances of graphical interfaces comprising activable graphics capable to be activated via the sales facilitator computing device and comprising a plurality of instances of graphical interfaces comprising activable graphics capable to be activated via the bidder computing devices;

receive, via the computer network, signals from the sales facilitator computing device generated via the sales facilitator graphical interface, the signals relating to:

information relating to the item; and parameters for controlling the sales process including a cost of buying the item now, a reserve price and a number of time periods;

store, responsive to the signals, the information relating to the item and parameter values in the memory device;

start a countdown timer executing in the at least one processor for measuring a first period of time, the at least one processor transmitting via the computer network a signal to each bidder computing devices to display the time remaining for visualization by the bidders;

receive, via the computer network, signals from the bidder computing devices via the bidder graphical interfaces, the signals relating to information relating to the respective bidder including terms of engagement proposed by the bidder and approved by the sales facilitator to enable the bidders to participate in the sales process, wherein the terms of engagement include purchase terms relating to the item of real estate;

store, responsive to the signals, the information and parameter values relating to the signals from the bidder computing devices in the memory device;

determine a ranking value for each bidder based on a comparison of the purchase terms proposed by the bidder with preferred purchase terms approved by the sales facilitator and storing said ranking values in the memory device;

receive by the server, via the computer network, signals from one or more of the bidder computing devices generated in response to bidder activation of a first icon which is activable to allow each of the bidders to input a starting bid for purchasing the item;

generate and transmit, via the computer network, a signal to the plurality of bidder computing devices, the signal causing the bidder computing devices to display, once the first icon has been activated by any of the bidders, to each of the bidders via the bidder devices, a second icon which is activable to allow one of the bidders to submit an improved bid which has the value of a bid increment added to the starting or the previously improved bid, the at least one processor storing the improved bid in the memory device;

while the first particular period of time is less than a first period of time, iteratively repeating steps a) and b):

a) when the first particular period of time is less than a difference between the first and a second time period, then the at least one processor receiving signals from bidder computing devices relating to activation of the second icon thereby allowing the bidder to continuously improve their bid;

b) when the first particular period of time is less than a difference between the first and second time periods, impeding the bidders from activating the first icon;

start a second countdown timer, executing in the processor, to measure a second particular period of time and iteratively performing the following step of:

displaying to each of the bidders via the bidder devices, a third icon which is activable to allow a particular bidder to improve their bid;

while the second particular period of time is less than a third period of time and the improved bid is less than the reserve price, permitting any bidder to activate the third icon to improve their bid;

reset the second countdown timer, executing in the at least one processor, to zero when any improved bid is greater than or equal to the reserve price and starting a third countdown timer, by the processor, to measure a third particular period of time, the at least one processor sending a signal to the bidder computing devices to display the remaining time measured by the third countdown timer, and, while the third particular period of time is less than a fourth period of time iteratively performing the step of:

permitting any bidder to activate the third icon to improve its previous bid;

determine which at least two bidders have the highest improved bids when compared to the other bidders;

determine which of the at least two bidders have a higher ranking value; and sell the item to one of at least two bidders on the basis of at least one of: the bidder's highest improved bids and ranking value.

\* \* \* \* \*